United States Patent [19]
Tamura et al.

[11] Patent Number: 5,688,574
[45] Date of Patent: Nov. 18, 1997

[54] OPTICAL RECORDING MEDIUM

[75] Inventors: Reiji Tamura; Yoshihiro Ikari; Toshiaki Taii, all of Kitasouma-gun; Norio Ota, Tsukuba-gun, all of Japan

[73] Assignee: Hitachi Maxell, Ltd., Osaka, Japan

[21] Appl. No.: 616,011

[22] Filed: Mar. 14, 1996

[30] Foreign Application Priority Data

Mar. 14, 1995 [JP] Japan .................................. 7-081714
May 29, 1995 [JP] Japan .................................. 7-153839

[51] Int. Cl.$^6$ .................................................. B32B 3/00
[52] U.S. Cl. .................. 428/64.1; 428/64.2; 428/64.4; 428/64.5; 428/64.6; 428/457; 428/913; 430/270.12; 430/270.13; 430/495.1; 430/945; 369/283; 369/288
[58] Field of Search .................. 428/64.1, 64.2, 428/64.4, 64.5, 64.6, 457, 913; 430/270.1, 270.11, 270.12, 270.13, 495.1, 945; 369/283, 288

[56] References Cited

U.S. PATENT DOCUMENTS

| | | | |
|---|---|---|---|
| 5,234,737 | 8/1993 | Ueno et al. | 428/64 |
| 5,254,382 | 10/1993 | Ueno et al. | 428/64 |
| 5,270,149 | 12/1993 | Iselborn et al. | 430/270 |
| 5,315,577 | 5/1994 | Kirino et al. | 369/116 |

FOREIGN PATENT DOCUMENTS

| | | |
|---|---|---|
| 61-258787 | 11/1986 | Japan . |
| 62-152786 | 7/1987 | Japan . |
| 4-228126 | 8/1992 | Japan . |
| 5-47036 | 2/1993 | Japan . |

OTHER PUBLICATIONS

Proceesings of 5th Symposium of Phase–Change Recording Society, J. Tominaga et al, Dated: Nov. 25, 1993, pp. 5–8.
Proceesing of 5th Symposium of Phase–Change Recording Society, S. Maita et al, Dated: Nov. 25, 1993, pp. 9–14.
"A CD–compatible erasable disc". J. H. Coombs et al, 94/SPIE vol. 2338 Optical Data Sorage (1994), pp. 94–106.

*Primary Examiner*—Patrick Ryan
*Assistant Examiner*—Elizabeth Evans
*Attorney, Agent, or Firm*—Birch, Stewart, Kolasch & Birch, LLP

[57] ABSTRACT

Disclosed is a phase-change optical recording medium which has a reflectance and a signal modulation conformed to the CD standard, and which is usable for recording at the same linear velocity as the reproducing velocity specified in the CD standard. The phase-change optical recording medium comprises a metallic layer, a first protective layer, a recording layer, a second protective layer, and a reflecting layer on a substrate, in which recording is performed through change from a crystalline state to an amorphous state in the recording layer. The recording layer comprises a recording material of a Ge—Te—Sb—Se system, and the recording layer has an average composition in a direction of thickness which satisfies the following relations as represented by atomic %:

$$Ge \geq 40\%, \text{ and } Sb+Se \leq 25\%$$

The recording medium has a reflectance of not less than 70% with respect to a light beam for reproduction when the recording layer is in one of the crystalline state and the amorphous state, and the recording medium has a reflectance of less than 40% when the recording layer is in the other state. An AuCo alloy is used as the metallic layer.

24 Claims, 7 Drawing Sheets

OPTICAL RECORDING MEDIUM

FIELD OF THE INVENTION

The present invention generally relates to a phase-change optical recording medium on which recording is performed on the basis of phase change between amorphous and crystalline states. In particular, the present invention relates to a phase-change optical recording medium having a reflectance and a signal modulation which are conformed to the CD standard.

DESCRIPTION OF THE RELATED ART

At present, optical disks exclusively used for reproduction (ROM optical disks), which are represented by music CD and CD-ROM and which include, for example, CD-I and video CD, have spread far and wide in various fields such as those of music, movie and computer. In general, such an optical disk is produced by previously forming recess-shaped pits on a substrate made of plastic such as polycarbonate, and then coating it with a metallic reflecting layer made of aluminum or the like. The produced optical disk is irradiated with a laser beam so that the presence or absence of pit (signal) is read as a difference in amount of reflected light. As for this technology, a standard for optical disks for music was firstly established, and the first product was on sale in 1982. Music CD was accepted by the market because of its excellent random access characteristics, its medium size of 80 to 120 mm to be handled easily, and inexpensiveness of media and systems. Thus the conventional analog record was replaced with the music CD. After that, this technology was progressively applied to establish standards for data CD-ROM, CD-I capable of handling still images and dynamic images, karaoke CD (CD for sing-along machines), video CD and so on. Various applications have appeared which conform these standards. On the other hand, the write-once CD (CD-R) capable of only once additional data writing was presented in 1988. CD-R is now forming a market as those for publication of CD in a small amount, and for debug during development of CD-ROM.

Rewritable media are also being developed rapidly. Known rewritable media include those which utilize a magneto-optical phenomenon that occurs on magneto-optical recording materials such as transition metal-rare earth metal systems, and those which utilize reversible change in atomic arrangement such as phase change. A lot of such products are industrially manufactured at present. Known phase-change recording media include, for example, a recording material of a Ge—Sb—Te—X system (X is Al, Si, Ti, etc.) as disclosed in Japanese Patent Laid-open No. 61-258787, and a recording material of a Ge—Te—A—B—C system (A is Sb, Sn, etc., B is Tl, etc., and C is Co, Se, etc.) as disclosed in Japanese Patent Laid-open No. 62-152786. It is also desirable for such rewritable recording media that information can be reproduced by using players as well as drive units which are compatible with CD and CD-ROM described above.

Accordingly, research and development are advanced for rewritable media capable of being subjected to reproduction with CD players as well as CD-ROM drives (hereinafter referred to as "rewritable CD"), especially for phase-change recording media. For example, Japanese Patent Laid-open No. 4-228126 discloses a technique relating to rewritable CD which uses a recording material of a Sb—Se system, and a recording material of a Ge—Te system.

Techniques are disclosed on pages 5–8 and pages 9–14 of Proceedings of 5th Symposium of Phase-Change Recording Society, which relate to rewritable CD that uses a recording material of an In—Ag—Te—Sb—V system, and rewritable CD that uses a recording material of a Ge—Sb—Te system.

By the way, it is necessary for reproduction of information with CD players or CD-ROM drives that characteristics of an optical recording medium, such as its reflectance and signal modulation should satisfy the CD standard (Red Book). Namely, at least the following conditions should be satisfied with respect to a light beam having a wavelength of 770 to 830 nm: (a) the reflectance is not less than 70%, (b) the signal modulation upon recording of an 11 signal as the longest mark at a mark distance of 11T is not less than 60%, and (c) the signal modulation upon recording of a 3T signal as the shortest mark at a mark distance of 3T is 30 to 70%, wherein the 11T signal and the 3T signal are included in EFM (Eight-Fourteen Modulation; 8–14 modulation) signals.

However, the manufactured products of the optical recording media of the phase-change type or the magneto-optical type described above have low reflectances, and hence they do not satisfy the CD standard. Accordingly, they have been incompatible with CD-related systems. For this reason, the following drawbacks have been pointed out. Namely, it is impossible for the optical recording media of the phase-change type as well as the magneto-optical type to reproduce information with CD players as well as CD-ROM drives. On the contrary, it is impossible for music CD media and CD-ROM media to reproduce information with drives for phase-change media as well as drives for magneto-optical media. Therefore, it has been inevitable to construct systems for reproduction on recording media of the phase-change type and the magneto-optical type, wherein the systems are completely different from CD-related systems.

The possibility has been presented in that a overwritable phase-change optical recording medium may be used as rewritable CD to perform reproduction with CD players as well as CD-ROM drives. However, no rewritable CD has been known which simultaneously satisfies the high reflectance of not less than 70% and the large degree of signal modulation of not less than 60% in order to fulfill the CD standard. In such a phase-change optical recording medium, the initialized state and the erased state correspond to a crystalline state having a high reflectance, and the recorded state corresponds to an amorphous state having a low reflectance. Therefore, when first recording is performed in the initialized state, the medium requires a large laser power which is not less than 50 mW on a film surface. In addition, when new information is directly overwritten over old information by using the mark edge (mark length) recording system, the following problem will arise. If an amorphous portion with remaining old recording marks and a crystalline portion with no record are irradiated with a laser beam having a power for recording, the former portion absorbs and accumulates a larger amount of heat than the latter portion, because the amorphous portion has a lower thermal conductivity and a higher heat-absorbing effect. Consequently, distortion occurs in new recording marks, resulting in increase in jitter.

According to the CD standard, the linear velocity during reproduction is 1.2 to 1.4 m/sec. Therefore, if a phase-change recording medium which is usable for reproduction with CD drives is developed, it is desirable that the medium is usable for recording at a linear velocity of 1.2 to 1.4 m/sec. However, such a relatively slow linear velocity provides a slow cooling speed of a recording layer when the recording layer is irradiated with light during recording. For this reason, the change from the crystalline state as the initialized state to the amorphous state is difficult to occur. Therefore, considering the crystallization speed and the property of thermal conductivity of recording materials, it is necessary to select a phase-change recording material with which recording is executed by assured occurrence of the phase change from the crystalline state to the amorphous state even in the case of recording at a linear velocity as described above.

Japanese Patent Laid-open No. 5-047036 discloses a write-once optical recording medium in which a Ge—Sb—Te system is used for a recording layer, transparent interfering layers are used over and under the recording layer, and the reflectance of the amorphous recording layer in a recorded state is made higher than the reflectance of the crystallized recording layer in a non-recorded state by adjusting the thickness and the refractive index of each of the layers. However, this document does not disclose the extent of reflectance actually obtained from the recording layer.

SPIE, Vol. 2338, OPTICAL DATA STORAGE (1994), pp. 94–106 discloses a technique relating to a rewritable phase-change CD which uses a recording material of a Ge—Sb—Te—Se system. It is disclosed that the use of this recording material makes it possible to obtain a reflectance of 70% with respect to a reproducing light beam. However, this phase-change CD is not sufficient from a practical viewpoint in that the signal modulation is smaller than the value specified in the CD standard, and the number of rewritable times is about 10. This recording material of the Ge—Sb—Te—Se system has a composition different from that of a recording material of a Ge—Sb—Te—Se system used in the present invention.

SUMMARY OF THE INVENTION

An object of the present invention is to provide a phase-change optical recording medium which can dissolve the drawbacks of the conventional art described above and which has a reflectance and a signal modulation conformed to the CD standard.

Another object of the present invention is to provide a phase-change optical recording medium which can prevent recording marks from deformation even in the case of recording and reproduction in accordance with the mark edge system.

Still another object of the present invention is to provide a phase-change optical recording medium on which recording can be performed at a low laser power.

Still another object of the present invention is to provide a phase-change optical recording medium which has a reflectance and a signal modulation conformed to the CD standard, and which makes it possible to perform recording at the same linear velocity as the reproducing velocity specified in the CD standard.

In order to achieve the objects described above, according to a first aspect of the present invention, there is provided an optical recording medium comprising a metallic layer, a first protective layer, a recording layer, a second protective layer, and a reflecting layer on a substrate, the recording medium being subjected to recording through change in atomic arrangement of the recording layer from a stable state to a metastable state, and the recording medium being subjected to initialization and erasing through change from the metastable state to the stable state, wherein:

the recording layer comprises a material containing major components of Ge, Te, Sb, and Se, and the recording layer has an average composition in a direction of thickness which satisfies the following relations as represented by atomic %:

$Ge \geq 40\%$, and $Sb+Se \leq 25\%$ the recording medium having a reflectance of not more than 40% with respect to a light beam for reproduction when the atomic arrangement of the recording layer is in the stable state, and the recording medium having a reflectance of not less than 70% with respect to the light beam for reproduction when the atomic arrangement of the recording layer is in the metastable state.

According to the optical recording medium of the first aspect of the invention, the reflectance of the recording medium is not more than 40% when the atomic arrangement of the recording layer is in the stable state, namely when the recording medium is in the initialized state. Accordingly, the light absorbance of the recording layer is increased, and recording can be performed at high sensitivity with less laser power during the recording. When direct overwriting is performed in which new information is directly recorded over old information, the light radiated onto portions of old recording marks is difficult to be absorbed, and the light radiated onto portions including no recording mark is easy to be absorbed, because the reflectance in the recorded state (amorphous state) is set to be higher than the reflectance in the erased state (crystalline state). FIG. 8 shows distribution of reflectance 35 when new recording marks are recorded over old recording marks on a conventional phase-change recording medium. A portion of an old mark 31 has hitherto had a low reflectance. Therefore, a light beam of high laser power has been absorbed in a larger amount by a portion 33 which overlaps a new mark 32 during recording. Further, the thermal conductivity is low at amorphous portions on which recording marks exist. Therefore, the heat is apt to be accumulated at the leading edge portion 33 of the new recording mark. The accumulated heat gradually diffuses from the portion 33. Thus the leading edge portion 33 of the recording mark 32 is apt to undergo deformation. On the contrary, the present invention provides inverted reflectance distribution with respect to recording marks and initialized portions. Accordingly, the heat is hardly accumulated at the portion 33 of the new recording mark which overlaps the old recording mark. On the other hand, the thermal conductivity is smaller in the recording mark than in initialized portions. Thus the heat is apt to stay in the portion 33 having less accumulated heat. On the contrary, the heat is apt to escape from portions (areas other than the portion 33 of the mark 32) in which the heat is accumulated. Consequently, influences exerted on the recording mark by the absorbance of heat and the thermal conductivity are offset even when new recording marks are formed by irradiating, with a laser beam, portions which include remaining old recording marks and portions which are not so. Thus the distortion of marks is much smaller than marks on conventional phase-change optical media.

It is preferable for the optical recording medium described above that the following relations are satisfied for a refractive index $n_1$ and a thickness $d_1$ of the first protective layer, a refractive index $n_2$ and a thickness $d_2$ of the second protective layer, a refractive index $n_c$ and an extinction coefficient $k_c$ of the recording layer in the stable state, a refractive index $n_a$ and an extinction coefficient $k_a$ of the recording layer in the metastable state, a thickness $d_r$ of the recording layer, and a wavelength $\lambda$ of the light beam for recording and reproduction:

$$k_a < k_c \qquad (1)$$

$$\exp(-4\pi k_a d_r/\lambda) \geq 0.65 \quad (2)$$

$$\exp(-4\pi k_c d_r/\lambda) \leq 0.75 \quad (3)$$

$$N\lambda - \lambda/4 + \Delta 1 \leq 2(n_1 d_1 + n_c d_r + n_2 d_2) \leq N\lambda + \lambda/4 + \Delta 1 \text{ (wherein } N \text{ is an integer)} \quad (4)$$

$$\lambda/2 + N\lambda - \lambda/4 + \Delta 2 \leq 2n_1 d_1 \leq \lambda/2 + N\lambda + \lambda/4 + \Delta 2 \text{ (wherein } N \text{ is an integer)} \quad (5)$$

$$|\Delta 1| \leq \lambda/2 \quad (6)$$

$$|\Delta 2| \leq \lambda/2 \quad (7)$$

According to a second aspect of the present invention, there is provided an optical recording medium comprising a metallic layer, a first protective layer, a recording layer, a second protective layer, and a reflecting layer on a substrate, the recording medium being subjected to recording through change in atomic arrangement of the recording layer from a stable state to a metastable state, and the recording medium being subjected to initialization and erasing through change from the metastable state to the stable state, wherein:

the recording layer comprises a material containing major components of Ge, Te, Sb, and Se, and the recording layer has an average composition in a direction of thickness which satisfies the following relations as represented by atomic %:

$$Ge \geq 40\%, \text{ and } Sb + Se \leq 25\%$$

the recording medium having a reflectance of not less than 70% with respect to a light beam for reproduction when the atomic arrangement of the recording layer is in the stable state, and the recording medium having a reflectance of not more than 40% with respect to the light beam for reproduction when the atomic arrangement of the recording layer is in the metastable state.

It is preferable for the optical recording medium according to the second aspect of the present invention described above that the following relations are satisfied for a refractive index $n_1$ and a thickness $d_1$ of the first protective layer, a refractive index $n_2$ and a thickness $d_2$ of the second protective layer, a refractive index $n_c$ and an extinction coefficient $k_c$ of the recording layer in the stable state, a refractive index $n_a$ and an extinction coefficient $k_a$ of the recording layer in the metastable state, a thickness $d_r$ of the recording layer, and a wavelength $\lambda$ of the light beam for recording and reproduction:

$$k_a < k_c \quad (8)$$

$$\exp(-4\pi k_a d_r/\lambda) \geq 0.5 \quad (9)$$

$$\exp(-4\pi k_c d_r/\lambda) \leq 0.5 \quad (10)$$

$$\lambda/2 + N\lambda - \lambda/4 + \Delta 1 \leq 2(n_1 d_1 + n_c d_r + n_2 d_2) \leq \lambda/2 + N\lambda + \lambda/4 + \Delta 1 \text{ (wherein } N \text{ is an integer)} \quad (11)$$

$$N\lambda - \lambda/4 + \Delta 2 \leq n_1 d_1 \leq N\lambda + \lambda/4 + \Delta 2 \text{ (wherein } N \text{ is an integer)} \quad (12)$$

$$|\Delta 1| \leq \lambda/2 \quad (13)$$

$$|\Delta 2| \leq \lambda/2 \quad (14)$$

DETAILED DESCRIPTION OF THE PREFERRED EMBODIMENTS

Figure 1:
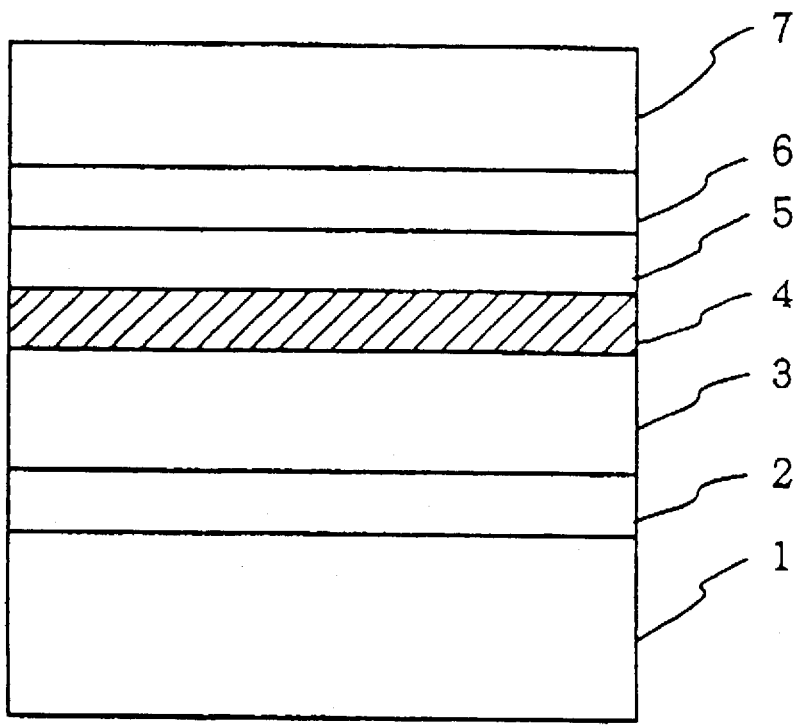
FIG. 1 shows a cross-sectional view illustrating a structure of an optical recording medium obtained in First Embodiment of the present invention.

In the optical recording medium of the present invention, the average composition of the recording layer in the direction of thickness has the atomic % of Ge as Ge $\geq 40\%$, and the atomic % of Sb and Se as Sb+Se $\leq 25\%$. Thus the recording layer can be changed from the crystalline state to the amorphous state by light irradiation during recording, which results in assured recording, even when recording is performed at a linear velocity of 1.2 to 1.4 m/s which would be used during reproduction as specified in the CD standard. The average composition of the recording layer in the direction of thickness preferably satisfies the following relations as represented by atomic %:

$$40\% \leq Ge \leq 64\%$$

$$45\% \leq Te \leq 59\%$$

$$1\% \leq Sb + Se \leq 20\%$$

$$Sb < Se$$

The co-existence of Ge, Te, Sb, and Se in the ratios described above in the recording layer makes it possible to stably hold the amorphous state, and advance crystallization during recording and erasing at high speeds. More preferably, the average composition satisfies the following relations:

$$40\% \leq Ge \leq 55\%$$

$$35\% \leq Te \leq 50\%$$

$$5\% \leq Sb + Se \leq 20\%$$

$$Sb < Se$$

Especially preferably, the average composition satisfies the following relations:

$$40\% \leq Ge \leq 50\%$$

$$35\% \leq Te \leq 45\%$$

$$10\% \leq Sb + Se \leq 20\%$$

$$Sb < Se$$

The recording layer may contain elements other than Ge, Te, Sb, and Se. They are preferably contained in ratios of not more than 10 atomic %. The elements other than Ge, Te, Sb, and Se which may be contained in the recording layer include metallic elements having high melting points such as Au, Ag, Cu, Pd, Ta, W, Ir, Sc, Y, Ti, Zr, V, Nb, Cr, Mo, Mn, Fe, Ru, Co, Rh, and Ni. These elements have an effect to facilitate absorption of light having a long wavelength such as a semiconductor laser beam so that the recording sensitivity is increased. In addition, these elements are difficult to melt even during recording and erasing, and hence they are apt to form crystal nuclei during crystallization so that high speed crystallization is facilitated. The recording layer may also contain elements such as Tl, halogen elements, and alkaline metals which improve the crystallization speed and improve stability of the amorphous state. Co-existence of the element such as Tl and the high melting point metal such as Co enables high speed crystallization, and provides high stability of the amorphous state as well as high recording sensitivity. When any one of the element such as Tl and the high melting point metal such as Co is selected for addition, the element such as Tl is preferably added since the film formation is facilitated, however, the resistance to oxidation is deteriorated. The recording layer may also contain inactive elements such as N, O, H, and Ar. These elements have an effect to increase the recording sensitivity by setting the thermal conductivity at an appropriate value, and they also have an effect to improve stability of the amorphous state. These elements also have an effect to suppress the noise level to be low by decreasing the diameter of crystal grains. When a rare earth metal or the like is added to the recording material in an amount of 1 to 5%, the intensity of reproduced signals can be increased, and the crystallization temperature can be raised. When at least two or more of the elements other than Ge, Te, Sb, and Se which may be contained in the recording layer are contained in the recording layer, they may be contained in a form of compound. The compound includes, for example, oxides such as $SiO_2$ and $Al_2O_3$; sulfides such as ZnS; fluorides such as $MgF_2$; nitrides such as $Si_3N_4$ and AlN; and carbides such as SiC. These compounds have an effect to adjust optical constants of the recording layer to be appropriate values so that the reflectance is raised, and the signal modulation is increased. They also have an effect to adjust the thermal conductivity to be an appropriate value so that the recording sensitivity is improved. When the elements described above are added to the recording layer, they may form a compound together with at least one of the elements of Ge, Te, Sb, and Se. For example, ZnTe, $Ag_2Te$, SnTe, and $Cr_4Te_5$ have high melting points, and they are difficult to melt even during recording and erasing. Accordingly, they are apt to form crystal nuclei during crystallization, and thus they enable high speed crystallization. They also have an effect to prevent physical deformation due to fluidization of the recording layer, and thus they enable rewriting over many times.

The composition of the recording layer may change in the direction of thickness provided that the average composition in the direction of thickness is within the range described above. The content of each of the elements usually changes only a little in the direction of thickness, however, there is no problem even when any change exists in an arbitrary pattern. However, the change in composition is preferably continuous. As for Sb, Se, and S, they preferably have higher contents in the vicinity of any one of interfaces of the recording layer or at the interfaces between the recording layer and other layers than inside the recording layer, judging from a viewpoint of resistance to oxidation.

When extremely small acicular magnetic material grains are uniformly dispersed or deposited in the recording medium, an effect is obtained in that they serve as nuclei to facilitate crystallization. In the case of recording in an external magnetic field, the acicular magnetic material grains align in a direction of the external magnetic field when the recording layer is melted. Accordingly, a crystalline state or an amorphous state each having a different structure can be produced as compared with a case of recording with no external magnetic field in which the magnetic material grains are directed in random directions. Thus four different states can be generated by combining the laser beam modulation with the magnetic field modulation.

When the recording layer is formed, it is also possible to provide an intermediate layer in the recording layer so that the recording layer is divided into two layers. The intermediate layer enables, for example, control for the cooling time of the recording layer, and control for the crystallization process. It is also possible to allow one recording bit to have a plurality of pieces of information by using the two layers of the recording layer divided by the intermediate layer such that information is recorded on only one of them, or information is recorded on both of them. The intermediate layer may be formed of the same materials as those for the interface layer described later, however, its thickness is preferably not more than 10 nm. The intermediate layer is not necessarily formed uniformly, which may be formed in a form of islands.

In the present invention, the stable state and the metastable state of the atomic arrangement of the recording layer generally mean the fact that the atomic arrangement of the recording layer is in a crystalline state and an amorphous state respectively. However, there is no limitation thereto. The stable state and the metastable state may be two states between which any optical property changes as a result of various changes in atomic arrangement that scarcely accompany change in shape of the film. For example, the stable state and the metastable state may be states between which the crystal grain diameter or the crystal form is different (different crystal states such as $\alpha$, $\beta$, $\pi$, and $\gamma$ types). As for the change between the amorphous state and the crystalline state, it is allowable that the amorphous is not complete amorphous, which may be mixed with crystalline parts. Alternatively, the change in state may occur between the recording layer and at least one of the protective layers and the intermediate layer either on account of movement (due to diffusion, chemical reaction, etc.) of a part of atoms for constituting these layers, or on account of both of movement and phase change. Thus resultant one may be in a stable state, and the other may be in a metastable state. Such a process also falls under this case.

The protective layers used in the optical recording medium of the present invention may be formed of organic materials including, for example, acrylic resin, polycarbonate, polyolefin, epoxy resin, polyimide, polyamide, polystyrene, polyethylene, polyethylene terephthalate, and fluororesin such as polytetrafluoroethylene (Teflon). Alternatively, the protective layers may be formed of inorganic materials comprising major components of oxide, fluoride, nitride, sulfide, selenide, carbide, boronide, boron, carbon, or metal. Alternatively, the protective layers may be formed of a composite material thereof. Inorganic materials are more preferable than organic materials from a viewpoint of resistance to heat. The protective layers comprising inorganic materials may be formed by, for example, electron beam vapor deposition, or sputtering as they are. However, the protective layers are more easily produced by means of reactive sputtering, or such that a film comprising at least one elements of metal, semi-metal, and semiconductor is formed, and then it is reacted with at least one of oxygen, sulfur, and nitrogen. Materials for the inorganic protective layer include, for example, oxides of at least one element selected from the group consisting of Ce, La, Si, In, Al, Ge, Pb, Sn, Bi, Te, Ta, Sc, Y, Ti, Zr, V, Nb, Cr, and W; sulfides or selenides of at least one element selected from the group consisting of Cd, Zn, Ga, In, Sb, Ge, Sn, Pb, and Bi; fluorides of elements such as Mg, Ce, and Ca; nitrides of elements such as Si, Al, Ta, and B; carbides of elements such as B and Si; boronides of elements such as Ti; boron; and carbon. More specifically, materials for the inorganic protective layer include, for example, those having major components of $CeO_2$, $La_2O_3$, SiO, $SiO_2$, $In_2O_3$, $Al_2O_3$, GeO, $GeO_2$, PbO, SnO, $SnO_2$, $Bi_2O_3$, $TeO_2$, $Ta_2O_5$, $Sc_2O_3$, $Y_2O_3$, $TiO_2$, $ZrO_2$, $V_2O_5$, $Nb_2O_5$, $Cr_2O_3$, $WO_2$, $WO_3$, CdS, ZnS, CdSe, ZnSe, $In_2S_3$, $In_2Se_3$, $Sb_2S_3$, $Sb_2Se_3$, $Ga_2S_3$, $Ga_2Se_3$, GeS, GeSe, $GeSe_2$, SnS, $SnS_2$, SnSe, $SnSe_2$, PbS, PbSe, $Bi_2Se_3$, $Bi_2S_3$, $MgF_2$, $CeF_3$, $CaF_2$, TaN, $Si_3N_4$, AlN, BN, Si, $TiB_2$, $B_4C$, SiC, B, and C; those having compositions similar thereto; and mixtures thereof. Among them, as for the sulfide, ZnS or compounds having compositions similar thereto are preferable since they provide an appropriate magnitude of refractive index, and a stable film. As for the nitride, TaN, $Si_3N_4$, AlN, or $AlSiN_2$, and compounds having compositions similar thereto are preferable since they provide a surface reflectance which is not so high, and a film which is stable and rigid. Preferred oxides include $Y_2O_3$, $Sc_2O_3$, $CeO_2$, $TiO_2$, $ZrO_2$, SiO, $Ta_2O_5$, $In_2O_3$, $Al_2O_3$, $SnO_2$, or silicon oxides having compositions similar to $SiO_2$. Amorphous compounds of Si containing hydrogen are also preferable. SiAlON or compounds having compositions similar thereto are also preferable. The first and second protective layers are preferably formed of identical materials since the operation is easy for forming films. However, they may be formed by using different materials. The recording sensitivity can be improved, and the protective layers can be prevented from physical deformation by appropriately selecting the thermal conductivity and the thermal expansion coefficient of materials to be used for each of them.

Interface layers may be provided in contact with the recording layer between the recording layer and the protective layers. One interface layer may be provided on one surface of the recording layer, or two interface layers may be provided on both surfaces of the recording layer. The interface layer prevents the recording layer from fluidization by improving wettability for the recording layer, and thus the number of rewritable times can be increased. It is also possible to control the crystallization process in the recording layer by providing the interface layer. Materials which are usable for constituting the interface layer include metallic elements having high melting points such as Au, Ag, Cu, Pd, Ta, W, Ir, Sc, Y, Ti, Zr, V, Nb, Cr, Mo, Mn, Fe, Ru, Co, Rh, Ni, Pt, Si, and Ge; semiconductor elements; and alloy materials thereof. Alternatively, those which are different from materials used for the protective films may be used, including oxides of at least one element selected from the group consisting of Ce, La, Si, In, Al, Ge, Pb, Sn, Bi, Te, Ta, Sc, Y, Ti, Zr, V, Nb, Cr, and W; sulfides or selenides of at least one element selected from the group consisting of Cd, Zn, Ga, In, Sb, Ge, Sn, Pb, and Bi; fluorides of elements such as Mg, Ce, and Ca; nitrides of elements such as Si, Al, Ta, and B; carbides of elements such as B and Si; boronides of elements such as Ti; boron; and carbon. In the case of use of materials having absorbance for the light beam for recording and reproduction, such as metals and semiconductor materials, the thickness of the film is preferably not more than 10 nm. The intermediate layer is not necessarily formed uniformly, which may be formed in a form of islands.

The reflecting layer used in the optical information recording medium of the present invention preferably comprises Au, Ag, Cu, Al, or those containing a major component of at least one of these elements, since the reflectance is high. When these elements are used singly, the reflectance is extremely high, but the recording sensitivity decreases because of their large thermal conductivities. Those containing major components of these elements and obtained by addition of other elements in small amounts provide good recording sensitivity, because the reflectance is high, and the thermal conductivity becomes small as compared with the case in which these elements are used singly. For example, when Au is selected from the elements described above, the additive element is preferably Ti, Cr, Co, Ni, etc., and most preferably Co. The additive element preferably has a content of not more than 10 atomic %. Alloys of the elements described above may be also used. For example, Au—Ag alloys and Au—Cu alloys provide characteristics equivalent or superior to those provided by the Au alloy described above concerning the reflectance and the recording sensitivity. In such alloys, the content of each of the elements is preferably 25 to 75%. Alternatively, other than those described above, the reflective layer to be used may comprise major components of at least one of Sb, Bi, In, Te, Se, Si, Ge, Pb, Ga, As, Zn, Cd, Sc, Ti, V, Cr, Mn, Fe, Co, Ni, Y, Zr, Nb, Mo, Tc, Ru, Rh, Pd, Hf, Ta, W, Re, Os, Ir, Pt, lanthanoids, and actinoids. Alternatively, these elements may be used as the additive element.

The optical information recording medium of the present invention uses the metallic layer between the substrate and the first protective layer. The same materials as those for the reflecting layer described above may be used for the metallic layer. AuCo alloys are especially preferable for the metallic layer because the reflectance is high, the thermal conductivity is smaller than a case in which each of the elements are used singly, and the recording sensitivity of the optical recording medium of the present invention is improved.

An additional protective layer is preferably formed on a side of the reflecting layer opposite to a side near to the recording layer in the optical recording medium of the present invention. Organic materials are used for the additional protective layer, including, for example, polystyrene, polytetrafluoroethylene (Teflon), polyimide, acrylic resin, polyolefin, polyethylene terephthalate, polycarbonate, epoxy resin, ethylene-vinyl acetate copolymer known as a hot-melt adhesive, self-adhesive, and ultraviolet-curing resin. The organic layer may be composed of a substrate. Of course, it is also possible to use inorganic materials comprising major components of oxide, fluoride, nitride, sulfide, selenide, carbide, boronide, boron, carbon, or metal. Alternatively, the additional protective layer may include two or more layers comprising organic materials and inorganic materials. The formation of the protective film as described above makes it possible to avoid increase in noise due to deformation of the recording layer during rewriting of records.

Each of the layers of the recording medium of the present invention can be formed by means of various methods. The method can be appropriately selected from, for example, vacuum deposition, vapor deposition in gas, sputtering, ion beam vapor deposition, ion plating, electron beam vapor deposition, injection molding, casting, rotary coating, and plasma polymerization. The metallic layer, the first and second protective layers, the recording layer, the reflecting layer, and the inorganic protective layer adjacent to the reflecting layer are most preferably formed by means of sputtering because the reproducibility is good, and the mass production is excellently performed.

The optical recording medium of the present invention should be initialized by causing crystallization over the entire surface of the recording layer. When any organic material is used in the substrate, the entire recording medium cannot be heated to a high temperature. Accordingly, the recording layer is crystallized by means of other methods. The method for crystallization preferably includes, for example, current application for a certain period of time, irradiation with a laser beam collected to have a spot diameter of not more than 2 μm, irradiation with ultraviolet light from a light source such as a xenon lamp and a mercury lamp and heating, irradiation with light from a flash lamp, irradiation with light by using a large light spot from a high-power gas laser or a high-output semiconductor laser, and a combination of heating and irradiation with a laser beam. In the case of irradiation with light from a high-power gas laser or a high-output semiconductor laser, good efficiency is obtained when the light spot diameter (half bandwidth) is not less than 5 μm and not more than 5 mm. In such a procedure, the time required for initial crystallization can be shortened when the longitudinal direction of the light spot is perpendicular to the track. It is also allowable that the crystallization occurs only on the track, and the spacing between tracks remains amorphous. On the other hand, for example, when a thin film comprising major components of Ge, Te, Sb, and Se is formed by rotary vapor deposition through a plurality of evaporating sources, Ge, Te, Sb, and Se scarcely bind immediately after the deposition in may cases. Also in the case of formation of a thin film by means of sputtering, a state is provided in which the atomic arrangement is extremely disordered. In such cases, the recording track is firstly irradiated with a high power density laser beam, and the film is preferably melted, if necessary. Further, when the recording track is irradiated with a low power density laser beam to cause crystallization, the reflectance is easily uniformalized over one round of the track. In order to record data on the recording medium thus initialized, recording is performed by causing the change in atomic arrangement of the recording layer, for example, from the crystalline state to the amorphous state through irradiation with light. This process is executed for a certain period of irradiation time with a certain light beam power so that no large physical deformation occurs in the recording layer.

The shape of the recording medium of the present invention is not limited to a disk shape. The recording medium can take various shapes including, for example, a shape of tape and a shape of card.

The optical recording medium of the present invention is preferably used as a recording medium on which recording and reproduction are performed in accordance with the mark edge system. The accuracy is required at positions of recording mark edges for recording and reproduction in accordance with the mark edge system. In relation to this requirement, the phase-change recording material of the present invention is preferred because the deformation of recording marks occurs extremely scarcely during recording.

When data on the recording film is rewritten, new data are recorded after once erasing previous recording data, or they are recorded through direct overwriting. In general, it is impossible to completely erase old data signals written on an identical recording track, and erasing residuals remain in some cases. The amount of existing erasing residuals is small in amorphous areas and areas in a state similar thereto, while it is large in crystalline areas and areas in a state similar thereto. Therefore, in order to delete the erasing residuals, levels of reproduced signals from crystalline areas or areas in a state similar thereto may be aligned at a certain level. Alternatively, the influence of the erasing residuals can be reduced by performing any processing so that at least variation is decreased. In another viewpoint, such erasing residuals are apt to locally exist on right and left sides rather than at a central portion of the track. Accordingly, a difference occurs between reflected light beams which come into each of a plurality of detectors arranged in a direction perpendicular to the track. On the other hand, newly recorded signals have good symmetricalness with respect to the right and left sides of the track. Therefore, signals based on the erasing residuals can be decreased by determining a difference between signals from the detector arranged on one side of the track and the detector arranged on the other opposite side, multiplying the difference by an appropriate multiple to obtain a product, and subtracting the product from a sum of the signals. These methods for restraining erasing residuals are not limited to materials of the type of phase change between crystalline and amorphous states, which are also effective on application to other materials to perform recording based on any change in atomic arrangement such as phase change.

The present invention has an advantage that distortion hardly occurs in newly recorded marks by direct overwriting because the reflectance in the metastable state such as the amorphous state is set to be low, and the reflectance in the stable state such as the crystalline state is set to be high. Additionally, the effect can be further enhanced by improving signal waveforms. For example, in accordance with the multiple pulse recording system in which a rectangular recording waveform is divided into a plurality of pulses, it is possible to prevent heat from accumulation at trailing edges of recording marks, and it is possible to form recording marks having good symmetricalness with respect to leading and trailing edges of the recording marks. When EFM signals of NT (N=3–11) are recorded, a certain method may be used, including methods for generating N individuals or (N–1) individuals of pulses once for each 1T. In accordance with such a method, a multiple pulse waveform can be produced by using a simple circuit, and recording marks having good symmetricalness and small jitter can be formed. When the pulse width is made constant for all pulses in this method, multiple pulses can be generated by using an extremely simple circuit. Accordingly, this method has an advantage that inexpensive drives can be supplied. On the other hand, when the pulse width is changed, it is possible to form recording marks having more improved symmetricalness. Methods for changing the pulse width include, for example, a method for lengthening only initial pulses to rapidly raise the temperature at mark leading edge portions at which the temperature would be otherwise hardly raised, and a method for lengthening the pulse width of later pulses. The method for lengthening later pulses especially has an effect when recording is performed such that a medium including a recording film having a fast crystallization speed is rotated at a low linear velocity, for example, not more than 2.8 m/s, (standard linear velocity (1.2–1.4 m/s) to double velocity (2.4 –2.8 m/s) for CD-ROM). When the medium is rotated at a low linear velocity, accumulation of heat in the recording layer is facilitated, and the cooling time for the recording layer becomes long. In such a situation, crystallization takes place during cooling, and no recording mark can be formed even if the recording layer is melted to form amorphous recording marks. Simultaneously, the heat is hardly accumulated, and the cooling time is shortest in the vicinity of the last pulse corresponding to the mark trailing edge. Accordingly, only such portions are made amorphous, and it is impossible to form normal marks having good symmetricalness. Thus the amorphous state can be normally formed, and recording marks having good symmetricalness can be formed by shortening the pulse width of earlier pulses to prevent heat from accumulation so that the cooling time for the recording layer is shortened. When the pulse width is changed as described above, the change may be continuous or discontinuous. Further, the power of each of pulses may be changed. When the power is changed, it is preferable that pulses in the vicinity of the leading head are allowed to have higher powers so that the energy of each of the pulses is made substantially constant. When only the pulse width is changed, or when both of the pulse width and the power are changed, the pulse width and/or the power may be previously set as functions of, for example, a mark length of a recording mark subjected to recording, distances between the recording mark and recording marks located just before and after it, and mark lengths of the recording marks located just before and after it so that the recording marks are optimized. Alternatively, a test writing area may be provided on a part of the medium, and test writing may be appropriately performed on the area to make adjustment upon every test writing so that the recording marks are optimized.

When erasing is performed by using continuous light before forming new recording marks, it is possible to form recording marks having higher symmetricalness. The erasing with continuous light may be performed by using an optical head for recording, or by using another-head for erasing. The wavelength of light for erasing with continuous light may be made different from that for recording. In such a procedure, light beams from a semiconductor laser for recording and a semiconductor laser for continuous erasing having a wavelength different from it may be collected by using one objective lens. Alternatively, two heads may be of course used.

It is preferable for the optical recording medium of the present invention to perform solid phase erasing (erasing without melting process) at a linear velocity of 1.2 m/s or more. In accordance with the solid phase erasing, the recording film is not melted during erasing. Accordingly, the recording layer hardly undergoes fluidization and segregation, and the number of rewritable times is increased. When the solid phase erasing is performed at a linear velocity of not less than 1.2 m/s, it is preferable to use a recording layer which can be subjected to solid phase erasing at a linear velocity that is not less than a linear velocity used. The phase-change optical recording medium of the present invention is a medium which is usable for reproduction by using CD players and so on. Accordingly, the medium of the present invention is advantageous from a viewpoint of data reading in that recording can be performed at the same linear velocity as the linear velocity of 1.2 to 1.4 m/s which is used for reproduction on CD.

In the first aspect of the invention, in order to satisfy the conditions for the reflectance as described above, the thickness and the refractive index of the first and second protective layers and the recording layer are adjusted as follows. Namely, the recording medium is constructed so that the following relations are simultaneously satisfied for a refractive index $n_1$ and a thickness $d_1$ of the first protective layer, a refractive index $n_2$ and a thickness $d_2$ of the second protective layer, a refractive index $n_c$ and an extinction coefficient $k_c$ of the recording layer in the stable state, a refractive index $n_a$ and an extinction coefficient $k_a$ of the recording layer in the metastable state, a thickness $d_r$ of the recording layer, and a wavelength $\lambda$ of the light beam for recording and reproduction:

$$k_a < k_c \tag{1}$$

$$\exp(-4\pi k_a d_r/\lambda) \geq 0.65 \tag{2}$$

$$\exp(-4\pi k_c d_r/\lambda) \leq 0.75 \tag{3}$$

$$N\lambda - \lambda/4 + \Delta 1 \leq 2(n_1 d_1 + n_a d_r + n_2 d_2) \leq N\lambda + \lambda/4 + \Delta 1 \text{ (wherein } N \text{ is an integer)} \tag{4}$$

$$\lambda/2 + N\lambda - \lambda/4 + \Delta 2 \leq 2n_1 d_1 \leq \lambda/2 + N\lambda + \lambda/4 + \Delta 2 \text{ (wherein } N \text{ is an integer)} \tag{5}$$

$$|\Delta 1| \leq \lambda/2 \tag{6}$$

$$|\Delta 2| \leq \lambda/2 \tag{7}$$

Figure 4:
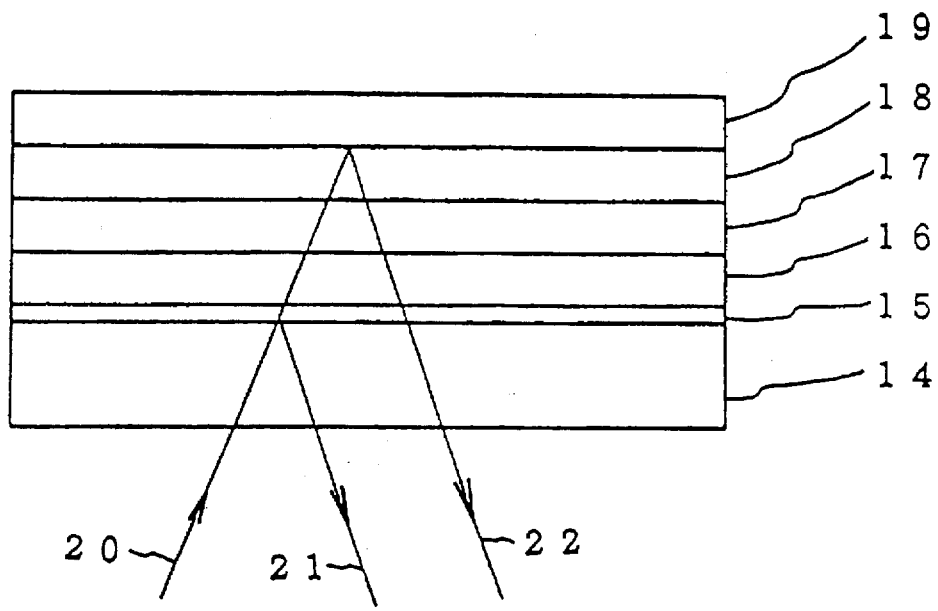
FIG. 4 shows a conceptual view illustrating a situation of reflection when a recording layer is in an amorphous state.
Figure 5:
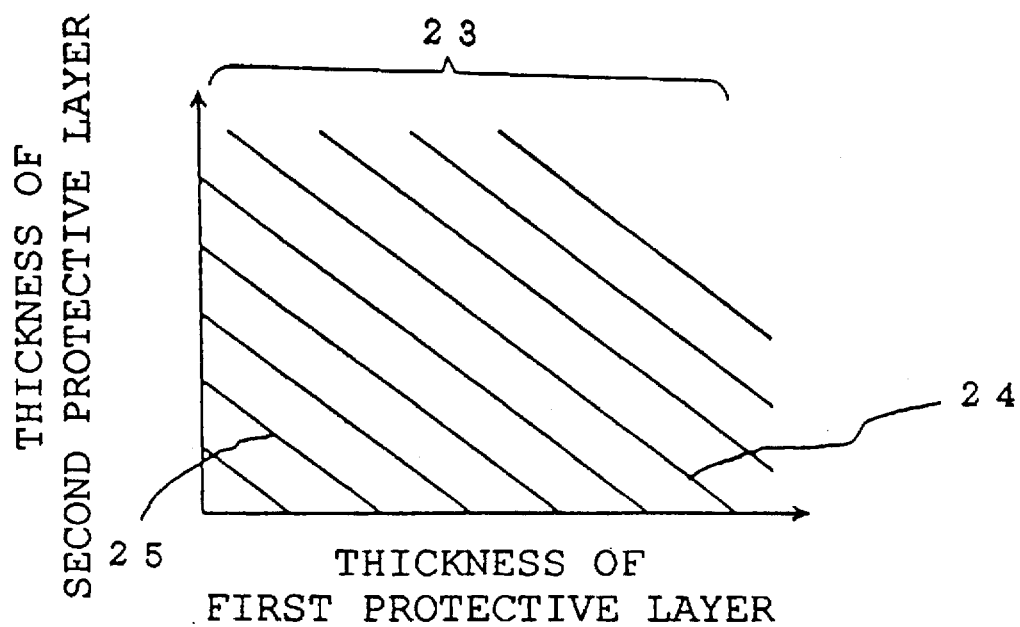
FIG. 5 shows a graph illustrating the reflectance with respect to thicknesses of first and second protective layers when the reflection in FIG. 4 is dominant.

The expression (1) indicates a condition for materials which are more difficult to absorb light when the recording layer is in the metastable state such as the amorphous state than when the recording layer is in the stable state such as the crystalline state with respect to the light having the wavelength $\lambda$. The left sides of the expressions (2) and (3) indicate the ratio of the amplitude of light transmitted through the recording layer to the amplitude of light come into the recording layer when the light is transmitted through the recording layer having the thickness $d_r$. The expression (2) indicates a desirable range of transmission of light through the recording layer when the recording layer is in the metastable state. FIG. 4 shows a situation of reflection of light from the optical recording medium in this case. A relatively large amount of light is transmitted through the recording layer 17. Accordingly, a reflected light beam from an interface between the second protective layer 18 and the reflecting layer 19 dominantly contributes to the entire reflected light from the recording medium. Therefore, the reflectance of the entire recording medium can be increased by causing an interfering action between a reflected light beam 21 (hereinafter referred to as "reflected light beam 1") from an interface between the substrate 14 and the metallic layer 15 and the reflected light beam 22 (hereinafter referred to as "reflected light beam 4") from the interface between the second protective layer 18 and the reflecting layer 19. The influence of the interfering action has been investigated in relation to the thicknesses of the first protective layer 16 and the second protective layer 18. As a result, it has been found that the reflectance of the entire recording medium is substantially constant if the sum of the thicknesses of the first protective layer 16 and the second protective layer 18 is constant. Namely, constant reflectance lines 23 as shown in FIG. 5 can be depicted with respect to the thicknesses of the first and second protective layers. For simplification, the thickness and the refractive index of the recording layer are considered to be constant, and the first protective layer 16 and the second protective layer 18 are considered to be made of the same material.

Figure 6:
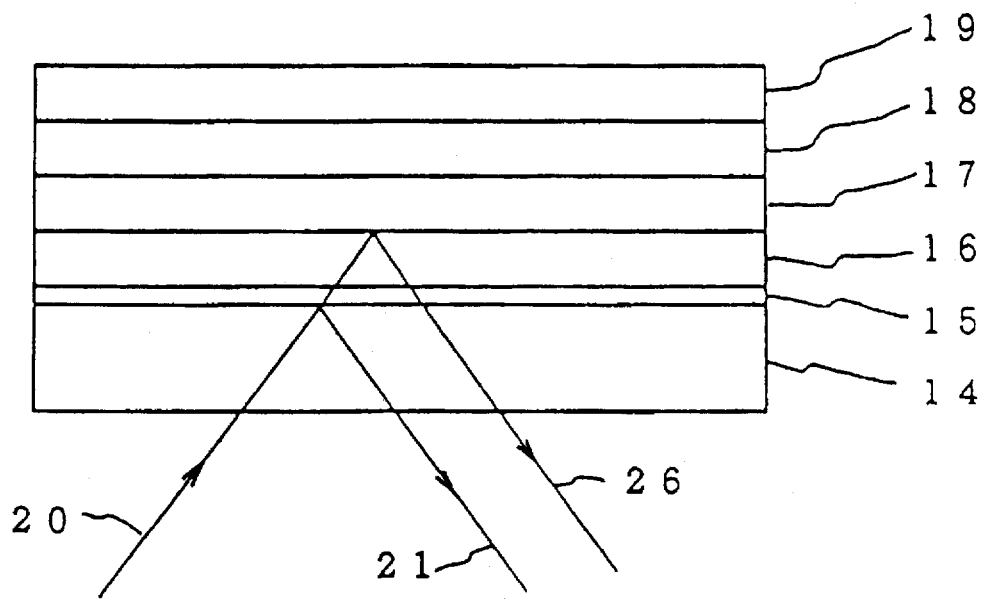
FIG. 6 shows a conceptual view illustrating a situation of reflection when a recording layer is in a crystalline state.
Figure 7:
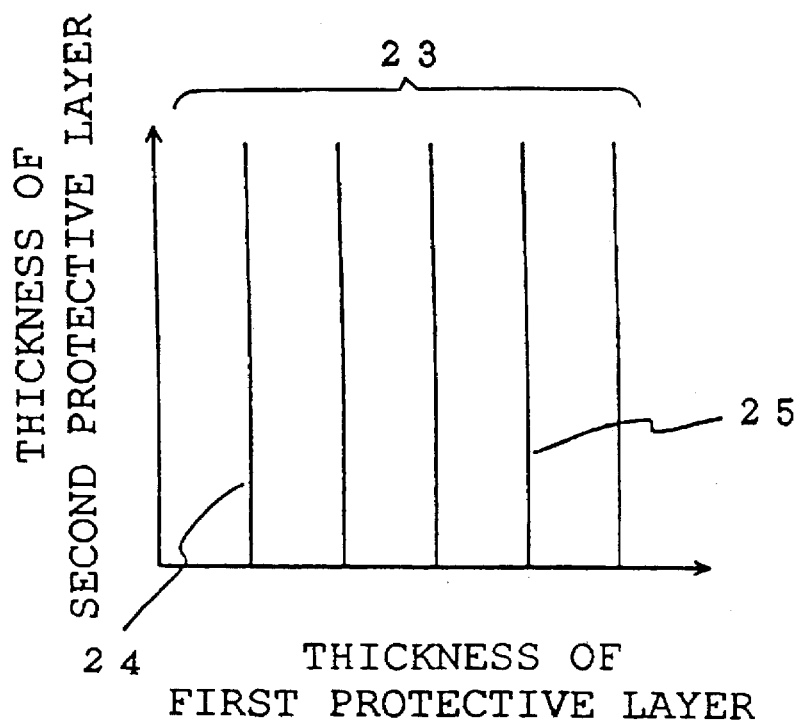
FIG. 7 shows a graph illustrating the reflectance with respect to thicknesses of first and second protective layers when the reflection in FIG. 6 is dominant.
Figure 8:
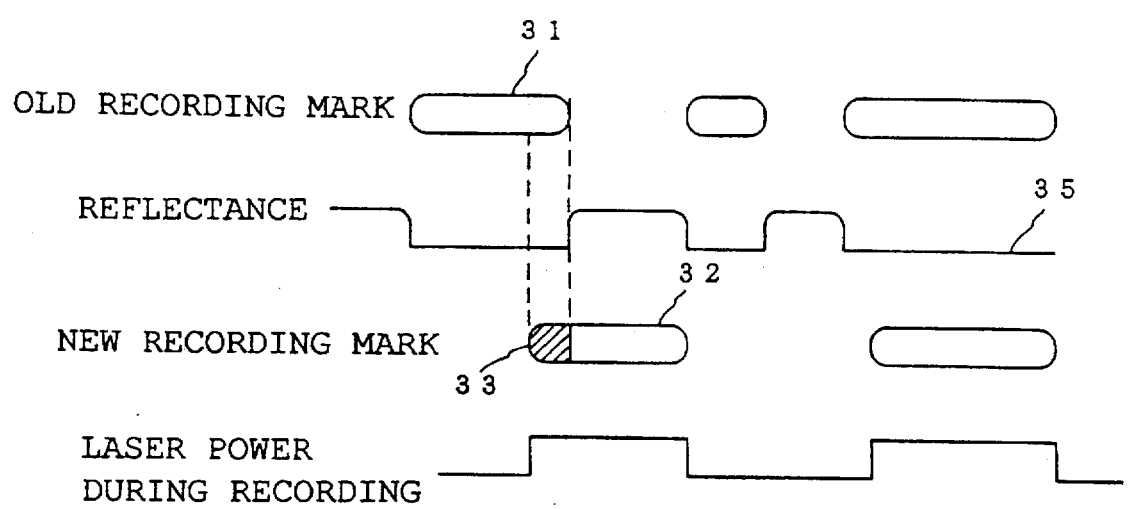
FIG. 8 shows the reflectance and the laser power of a recording laser beam when new recording marks are overwritten over old recording marks.

On the other hand, the expression (3) indicates that the amount of light transmitted through the recording layer should be not more than a predetermined value when the recording layer is in the stable state. Namely, the amount of light transmitted through the recording layer, which is included in the reflected light from the entire recording medium, is limited to decrease the influence of the reflected light beam from the interface between the second protective layer 18 and the reflecting layer 19. In the case of materials which satisfy this condition, as shown in FIG. 6, the entire reflectance is greatly affected by interference between the reflected light beam 21 (reflected light beam 1) from the interface between the substrate 14 and the metallic layer 15 and a reflected light beam 26 (reflected light beam 2) from an interface between the first protective layer 16 and the recording layer 17. The relation between the entire reflectance and the thicknesses of the first protective layer 16 and the second protective layer 18 has been investigated. As a result, it is possible to depict constant reflectance lines 25 as shown in FIG. 7. The reflectance of the entire recording medium almost depends only on the thickness of the first protective layer 16.

When FIG. 5 and FIG. 7 are superimposed with each other, a point is found at which the constant reflectance line 24 on which the entire reflectance Ra when the recording layer is in the amorphous state is maximized intersects the constant reflectance line 25 on which the entire reflectance Rc when the recording layer is in the crystalline state is minimized. It is understood that a large difference in reflectance between the crystalline and amorphous states can be provided in a relatively wide area around the point described above. Therefore, if the expressions (2) and (3) are satisfied, the large difference in reflectance between the crystalline and amorphous states can be provided while maintaining wide margins with respect to the thicknesses of the first and second protective layers.

The expressions (4) to (7) indicate conditions under which $R_a$ is not less than 70%, and $R_c$ is not more than 40%. The expression (4) indicates that the deviation is not more than $\lambda/4$ from the following condition under which the reflected light beam (light beam 1) from the interface between the substrate and the metallic layer interferes with the reflected light beam (reflected light beam 4) from the interface between the second protective layer and the reflecting layer to provide mutual intensification when the recording layer is in the metastable state such as the amorphous state:

$$2(n_1 d_1 + n_a d_r + n_2 d_2) = N\lambda + \Delta 1 \text{ (wherein } N \text{ is an integer)}$$

It has been found that the reflectance of the recording medium is not less than 70% when this condition is satisfied. The term $\Delta 1$ in the expressions indicates the deviation in phase of the reflected light beam 4 with respect to the reflected light beam 1 when no optical path difference is considered. The term $\Delta 1$ can take various values depending on materials and thicknesses of each of the layers, and it can take a value up to $\lambda/2$ in maximum as an absolute value. For example, the term $\Delta 1$ is calculated to be about $\lambda/20$ when the metallic layer and the reflecting layer use a material comprising a major component of Au, the first and second protective layers use a material having a refractive index of about 2, and the recording layer uses a material having a refractive index of about 4 and an extinction coefficient of about 1 in its amorphous state. Therefore, the expression (4) is converted as follows:

$$N\lambda - \lambda/4 + \lambda/20 \leq 2(n_1 d_1 + n_a d_r + n_2 d_2) \leq N\lambda + \lambda/4 + \lambda/20 \text{ (wherein } N \text{ is an integer)} \quad (4')$$

At this time, N=1 is most preferable.

The expression (5) indicates a condition under which the deviation is not more than $\lambda/4$ from the following condition under which the reflected light beam (light beam 1) from the interface between the substrate and the metallic layer interferes with the reflected light beam (reflected light beam 2) from the interface between the first protective layer and the recording layer to provide mutual reduction when the recording layer is in the stable state such as the crystalline state:

$$2n_1 d_1 = \lambda/2 + N\lambda + \Delta 2 \text{ (wherein } N \text{ is an integer)}$$

It has been found that the reflectance is not more than 40% when this condition is satisfied. The term $\Delta 2$ in the expressions indicates the deviation in phase of the reflected light beam 2 with respect to the reflected light beam 1 when no optical path difference is considered. The term $\Delta 2$ can take various values depending on materials and thicknesses of each of the layers, and it can take a value up to $\lambda/2$ in maximum as an absolute value. For example, the term $\Delta 2$ is calculated to be about $\lambda/3$ when the metallic layer and the reflecting layer use a material comprising a major component of Au, the first and second protective layers use a material having a refractive index of about 2, and the recording layer uses a material having a refractive index of about 5.5 and an extinction coefficient of about 4 in its crystalline state. Therefore, the expression (5) is converted as follows:

$$\lambda/2 + N\lambda - \lambda/4 + \lambda/3 \leq 2n_1 d_1 \leq \lambda/2 + N\lambda + \lambda/4 + \lambda/3 \text{ (wherein } N \text{ is an integer)} \quad (5')$$

At this time, N=0 is most preferable.

In a typical optical recording medium according to the present invention, the following materials may be used:

metallic layer and reflecting layer: material comprising a major component of Au;

first and second protective layers: material having a refractive index of 2;

recording layer: recording material having a refractive index of 4 and an extinction coefficient of 1 in its amorphous state, and having a refractive index of 5.5 and an extinction coefficient of 4 in its crystalline state.

When the materials described above are used, and a laser beam having a wavelength of 780 nm is used for recording and reproduction, then the thickness of each of the layers to satisfy the conditional expressions described above has the following most preferable ranges:

first protective layer: 114 to 211 nm;

recording layer: 4 to 27 nm;

sum of thicknesses of first and second protective layers: 129 to 250 nm.

Next, the optical recording medium according to the second aspect of the present invention has the following feature. Namely, the recording medium has a reflectance of not less than 70% when the atomic arrangement of the recording layer is in the stable state, and the recording medium has a reflectance of not more than 40% when the atomic arrangement of the recording layer is in the metastable state. Such an optical recording medium can be achieved by adjusting the thicknesses and the refractive indexes of the first and second protective layers and the recording layer as follows. Namely, the recording medium is constructed so that the following relations are simultaneously satisfied for a refractive index $n_1$ and a thickness $d$ of the first protective layer, a refractive index $n_2$ and a thickness $d_2$ of the second protective layer, a refractive index $n_c$ and an extinction coefficient $k_c$ of the recording layer in the stable state, a refractive index $n_a$ and an extinction coefficient $k_a$ of the recording layer in the metastable state, a thickness $d_r$ of the recording layer, and a wavelength $\lambda$ of the light beam for recording and reproduction:

$$k_a < k_c \quad (8)$$

$$\exp(-4\pi k_c d_r/\lambda) \geq 0.5 \quad (9)$$

$$\exp(-4\pi k_a d_r/\lambda) \leq 0.5 \quad (10)$$

$$\lambda/2 + N\lambda - \lambda/4 + \Delta 1 \leq 2(n_1 d_1 + n_a d_r + n_2 d_2) \leq \lambda/2 + N\lambda + \lambda/4 + \Delta 1 \text{ (wherein } N \text{ is an integer)} \quad (11)$$

$$N\lambda - \lambda/4 + \Delta 2 \leq 2n_1 d_1 \leq N\lambda + \lambda/4 + \Delta 2 \text{ (wherein } N \text{ is an integer)} \quad (12)$$

$|\Delta1| \leq \lambda/2$ (13)

$|\Delta2| \leq \lambda/2$ (14)

The expression (8) indicates a condition for materials which are more difficult to absorb light when the recording layer is in the metastable state such as the amorphous state than when the recording layer is in the stable state such as the crystalline state with respect to the light having the wavelength λ. The left sides of the expressions (9) and (10) indicate the ratio of the amplitude of light transmitted through the recording layer to the amplitude of light come into the recording layer when the light is transmitted through the recording layer having the thickness $d_r$ in the same manner as the expressions (2) and (3) described above. The expression (9) indicates a desirable range of transmission of light through the recording layer when the recording layer is in the metastable state. FIG. 4 shows a situation of reflection of light from the optical recording medium in this case. In the same manner as described above, the reflectance of the entire recording medium can be increased by causing an interfering action between the reflected light beam 1 from the interface between the substrate 14 and the metallic layer 15 and the reflected light beam 4 from the interface between the second protective layer 18 and the reflecting layer 19. The reflectance of the entire recording medium is substantially constant if the sum of the thicknesses of the first protective layer 16 and the second protective layer 18 is constant. Thus constant reflectance lines 23 as shown in FIG. 5 can be depicted with respect to the thicknesses of the first and second protective layers. Also in this second aspect, the thickness and the refractive index of the recording layer are considered to be constant, and the first protective layer 16 and the second protective layer 18 are considered to be made of the same material for simplification.

On the other hand, in the same manner as the expression (3), the expression (10) indicates that the amount of light transmitted through the recording layer should be not more than a predetermined value when the recording layer is in the stable state. Namely, the amount of light transmitted through the recording layer, which is included in the reflected light from the entire recording medium, is limited to decrease the influence of the reflected light beam from the interface between the second protective layer 18 and the reflecting layer 19. In the case of materials which satisfy this condition, as shown in FIG. 6, the entire reflectance is greatly affected by interference between the reflected light beam 21 (reflected light beam 1) from the inter ace between the substrate 14 and the metallic layer 15 and a reflected light beam 26 (reflected light beam 2) from an interface between the first protective layer 16 and the recording layer 17. The relation between the entire reflectance and the thicknesses of the first protective layer 16 and the second protective layer 18 is represented by constant reflectance lines 25 as shown in FIG. 7 in the same as described above. The reflectance of the entire recording medium almost depends only on the thickness of the first protective layer 16.

FIG. 5 and FIG. 7 are with each other. Thus a point is found at which the constant reflectance line 24 on which the entire reflectance Ra when the recording layer is in the amorphous state is maximized intersects the constant reflectance line 25 on which the entire reflectance Rc when the recording layer is in the crystalline state is minimized. It is understood that a large difference in reflectance between the crystalline and amorphous states can be provided in a relatively wide area around the point described above. Therefore, if the expressions (9) and (10) are satisfied, the large difference in reflectance between the crystalline and amorphous states can be provided while maintaining wide margins with respect to the thicknesses of the first and second protective layers.

The expressions (11) to (14) indicate conditions under which $R_a$ is not more than 40%, and $R_c$ is not less than 70%. The expression (11) indicates that the deviation is not more than λ/4 from the following condition under which the reflected light beam (light beam 1) from the interface between the substrate and the metallic layer interferes with the reflected light beam (reflected light beam 4) from the interface between the second protective layer and the reflecting layer to provide mutual reduction when the recording layer is in the metastable state such as the amorphous state:

$2(n_1d_1+n_rd_r+n_2d_2)=\lambda/2+N\lambda+\Delta1$ (wherein $N$ is an integer)

It has been found that the reflectance of the recording medium is not more than 40% when this condition is satisfied. The term $\Delta1$ in he expressions indicates the deviation in phase of the reflected light beam 4 with respect to the reflected light beam 1 when no optical path difference is considered. The term $\Delta1$ can take various values depending on materials and thicknesses of each of the layers, and it can take a value up to λ/2 in maximum as an absolute value. For example, the term $\Delta1$ is calculated to be about λ/20 when the metallic layer and the reflecting layer use a material comprising a major component of Au, the first and second protective layers use a material having a refractive index about 2, and the recording layer uses a material having a refractive index of about 4 and an extinction coefficient of about 1 in its amorphous state. Therefore, the expression (11) is converted as follows:

$\lambda/2+N\lambda-\lambda/4+\lambda/20 \leq 2(n_1d_1+n_rd_r30\ n_2d_2) \leq \lambda/2+N\lambda+\lambda/4+\lambda/20$
(wherein $N$ is an integer) (11')

At this time, N=0 is most preferable.

The expression (12) indicates a condition under which the deviation is not more than λ/4 from the following condition under which the reflected light beam (light beam 1) from the interface between the substrate and the metallic layer interferes with the reflected light beam (reflected light beam 2) from the interface between the first protective layer and the recording layer to provide mutual intensification when the recording layer is in the stable state such as the crystalline state:

$2n_1d_1=N\lambda+\Delta2$ (wherein $N$ is an integer)

It has been found that the reflectance is not less than 70% when this condition is satisfied. The term $\Delta2$ in the expressions indicates the deviation in phase of the reflected light beam 2 with respect to the reflected light beam 1 when no optical path difference is considered. The term $\Delta2$ can take various values depending on materials and thicknesses of each of the layers, and it can take a value up to λ/2 in maximum as an absolute value. For example, the term $\Delta2$ is calculated to be about λ/3 when the metallic layer and the reflecting layer use a material comprising a major component of Au, the first and second protective layers use a material having refractive index of about 2, and the recording layer uses material having a refractive index of about 5.5 and an extinction coefficient of about 4 in its crystalline state. Therefore, the expression (12) is converted as follows:

$N\lambda-\lambda/4+\lambda/3 \leq 2n_1d_1 \leq N\lambda+\lambda/4+\lambda/3$ (wherein N is an integer) (12')

At this time, N=0 is most preferable.

In a typical optical recording medium according to the present invention, the following materials may be used:

metallic layer and reflecting layer: material comprising a major component if Au;

first and second protective layers: material having a refractive index of 2;

recording layer: recording material having a refractive index of 4 and an extinction coefficient of 1 in its amorphous state, and having a refractive index of 5.5 and an extinction coefficient of 4 in its crystalline state.

When the materials described above are used, and a laser beam having a wavelength of 780 nm is used for recording and reproduction, then the thickness of each of the layers to satisfy the conditional expressions described above has the following most preferable ranges:

first protective layer: 16 to 114 nm;

recording layer: 11 to 43 nm;

sum of thicknesses of first and second protective layers: not more than 134 nm.

First Embodiment

According to the present invention, an optical recording medium was produce as follows so that the recording medium had a reflectance of not more than 40% when the atomic arrangement of the recording layer was in a stable state, and the recording medium had a reflectance of not less than 70% when the atomic arrangement of the recording layer was in a metastable state. A substrate was provided, comprising a surface of a polycarbonate resin plate having a diameter of 120 mm and a thickness of 1.2 mm on which U-shaped guide grooves having a width of 0.8 µm and a depth of 20 nm were previously formed at a pitch of 1.6 µm. This substrate was laced in a first sputtering chamber in a magnetron sputtering apparatus including a plurality of sputtering chambers with which films having excellent uniform thicknesses could be formed with excellent reproducibility. A metallic layer of $Au_{97}Co_3$ having a thickness of 18 nm was formed on the substrate by using an alloy of AuCo as a target, and using argon gas as a sputtering gas. Next, the substrate was transferred to a second sputtering chamber. After that, a first protective layer of $(ZnS)_{80}(SiO_2)_{20}$ (molar %) having a thickness of 135 nm was formed in argon gas by using a mixture of ZnS and $SiO_2$ as a target. In the same manner, a recording layer of $Ge_{43}Te_{41}Sb_7Se_9$ having a thickness of 10 nm was formed in argon gas in a third sputtering chamber by using a sintered material of GeTeSbSe as a target. Next, a second protective layer of $(ZnS)_{80}(SiO_2)_{20}$ having a thickness of 30 nm was formed in argon gas in a fourth sputtering chamber by using a mixture of ZnS and $SiO_2$ as a target. Finally, a reflecting layer of $Au_9Co_3$ having a thickness of 35 nm was formed in argon gas in a fifth sputtering chamber by using an alloy of AuCo as a target. The laminated substrate was withdrawn from the sputtering apparatus, and a protective layer of ultraviolet-curing resin was spin-coated on its uppermost layer. FIG. 1 a cross-sectional view of the optical recording medium thus obtained. The optical recording medium of this embodiment comprised a polycarbonate substrate 1 on which a metallic layer 2 of the Au—Co system, a first protective layer 3 of the ZnS—$SiO_2$ system, a recording layer 4 of the Ge—Te—Sb—Se system, a second protective layer 5 of the ZnS—$SiO_2$ system, a reflecting layer 6 of the Au—Co system, and a protective layer 7 of the ultraviolet-curing resin were successively laminated.

The refractive index and the extinction coefficient with respect to a light beam having a wavelength of 780 nm were measured for the materials which constituted each of the layers. Results are shown below.

Metallic layer of $Au_{97}Co_3$ and reflecting layer of $Au_{97}Co_3$: 0.345/5.069i First and second protective layers of $(ZnS)_{80}(SiO_2)_{20}$: 2.0/0.0i Recording layer of $Ge_{43}Te_{41}Sb_7Se_9$: 4.14/0.89i (amorphous), 5.52/3.80i (crystal)

The refractive index and the extinction coefficient were measured by using a spectrophotometric ellipsometer. They were also calculated for the recording layer from values of transmittance and reflectance in accordance with the Male method.

Automatic focusing was performed by using a semiconductor laser beam having a wavelength of 780 nm while rotating the disk produced as described above at a linear velocity of 1.2 m/s by sing a drive unit. In this procedure, the intensity of the laser beam was maintained at a degree at which no recording was made. The laser beam was collected by using a lens included in a recording head, and then the recording layer was irradiated with the laser beam through the substrate to detect its reflected light beam. Thus adjustment was made so that the focal point was located on the recording layer. While the automatic focusing was performed as described above, the head was driven to perform tracking so that a center of a light spot always coincided with a center of the guide groove. At this time, specially produced portions with no guide groove had a reflectance of 74%, and portions with the guide groove had a reflectance of 70%.

Next, the recording layer on the recording track was heated by continuously radiating a laser beam of 9 mW while performing tracking. Thus each of the elements was reacted and crystallized to initialize the recording layer. After the initialization, the portions with no guide groove had a reflectance of 25%, and the portions with the guide groove had a reflectance of 21%. At this time, no large physical deformation was observed in the recording layer.

Figure 2:
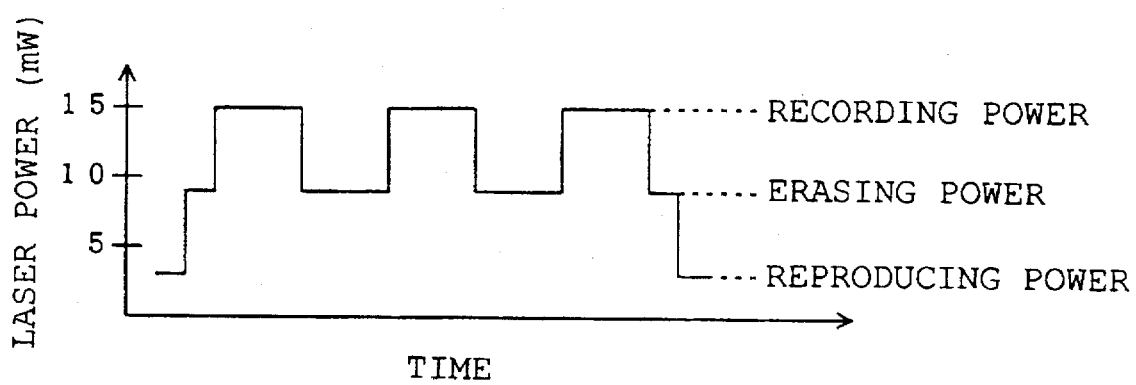
FIG. 2 shows a laser waveform for overwrite recording in embodiments of the present invention.

Next, an 11T repeating signal was recorded with a laser power of 15 mW while maintaining the linear velocity of the disk at 1.2 m/s. As a result, recorded portions had an increased reflectance of 70%. The signal modulation obtained at this time was 70% provided that the signal modulation is defined as a difference in reflectance (difference in signal intensity) between recorded portions and non-recorded portions with respect to a reflectance (signal intensity) of the recorded portions. A 3T repeating signal was overwrite-recorded on the track having been once subjected to recording as described above. In this procedure, recording, erasing, and reproduction were performed by using an overwrite waveform as shown in FIG. 2. The recording power was 15 mW which was the same as that used in the initial recording. The erasing power and the reproducing power were 9 mW and 1 mW respectively. A signal modulation of 45% was obtained during recording of the 3T signal. At this time, the erasing ratio for the 11T signal was 30 dB.

The disk produced as described above was initialized by using a continuous light beam at 9 mW. After that, a 3T signal was firstly recorded, and then an 11T signal was overwritten. As a result, a similar degree of signal modulation and a similar erasing ratio for the 3T signal were also obtained. Although the overwriting operation was further repeated 1,000 times, subsequent values of them scarcely changed. When the erasing power was increased to 12 mW to perform melt-erasing (erasing with melting process), the erasing ratio was decreased to not more than 25 dB, and the signal modulation of the 11T signal was 50% at the number of overwrite times of 10 or more.

Next, the laser power was modulated between 15 mW and 9 mW to record EFM signals on the disk. The disk was installed in a CD-ROM tester provided with an optical head having a wavelength of 780 nm to measure the block error ratio (BLER). At this time, the C1 error ratio was demonstrated as a good value of 0.3%.

Figure 9:
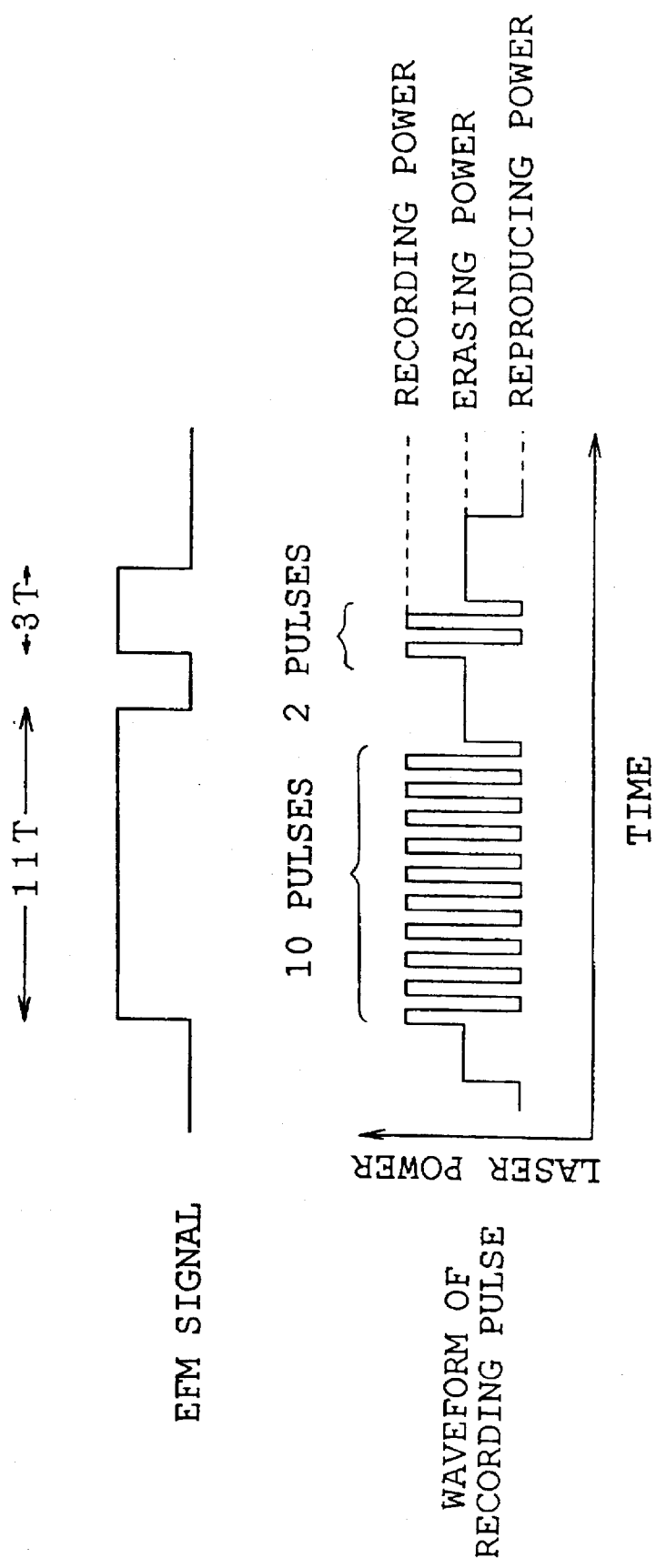
FIG. 9 shows pulse signal waveforms used for overwrite recording of 11T and 3T signals on the optical recording media in embodiments of the present invention.

The same experiment as that described above was performed except that each of the recording pulses was divided into a plurality of pulses. At first, when the 11T signal was recorded, 11 individuals of pulses having a pulse width of 77 ns were generated at a cycle of 231 ns. When the 3T signal was recorded, 3 individuals of the same pulses were generated at the same cycle. When recording was performed in accordance with this method, the symmetricalness of recording marks was increased, and the jitter was decreased. Further, this method had an additional effect to decrease the jitter and decrease the C1 error ratio when the number of pulses was decreased by 1 individual, and the laser power from one pulse to the next pulse was lowered to 0 mW or to a power near to that of the reproducing light beam, as represented by a recording pulse waveform shown in FIG. 9. Moreover, an effect to prevent recrystallization was confirmed when the pulse width of each pulse was changed, and the pulse width was shortened for those pulses which were closer to the leading head pulse. At this time, an additional effect was obtained when the power was increased for those pulses which were closer to the leading head pulse. After performing erasing with a continuous light beam of 9 mW, new information was written by means of direct overwriting. As a result, the jitter was decreased as compared with a case in which the erasing with the continuous light beam was not performed.

The thickness of the second protective layer of the disk described above was changed as shown in Table 1 to produce various disks while maintaining the thicknesses of the recording layer and the first protective layer. The reflectance of each of the produced disks and the laser beam power required for recording were changed as shown in Table 1.

TABLE 1

| Thickness of second protective layer (nm) | Reflectance of disk (%, amorphous) | Reflectance of disk (%, crystal) | Laser power required for recording (mW) |
|---|---|---|---|
| 0 | 71 | 25 | 25 or more |
| 5 | 71 | 25 | 25 |
| 10 | 72 | 24 | 20 |
| 20 | 74 | 22 | 17 |
| 30 | 74 | 21 | 15 |
| 50 | 72 | 24 | 14 |
| 80 | 71 | 25 | 13 |
| 100 | 70 | 26 | 12 |
| 110* | 64 | 28 | 11 |

(*: Comparative Example)

The thickness of the first protective layer of the disk described above was changed as shown in Table 2 to produce various disks in accordance with the operation of the embodiment described above while maintaining the thicknesses of the recording layer and the second protective layer to be 10 nm and 30 nm respectively. The reflectance of each of the obtained disks is shown in Table 2.

TABLE 2

| Thickness of first protective layer (nm) | Reflectance of disk (%, amorphous) | Reflectance of disk (%, crystal) |
|---|---|---|
| 90* | 64 | 41 |
| 100 | 70 | 30 |
| 114 | 71 | 28 |
| 135 | 74 | 21 |
| 160 | 74 | 21 |
| 200 | 70 | 28 |
| 220* | 64 | 41 |

(*: Comparative Example)

The thickness of the recording layer of the disk described above was changed as shown in Table 3 to produce various disks in accordance with the operation of the embodiment described above while maintaining the thicknesses of the first and second protective layers to be 135 nm and 30 nm respectively. The reflectance of each of the obtained disks is shown in Table 3.

TABLE 3

| Thickness of recording layer (nm) | Reflectance of disk (%, amorphous) | Reflectance of disk (%, crystal) |
|---|---|---|
| 3* | 80 | 55 |
| 5 | 78 | 30 |
| 10 | 74 | 21 |
| 30 | 70 | 23 |
| 35* | 60 | 25 |

(*: Comparative Example)

According to the results described above, it is understood that when the thickness is set within the range to satisfy the expressions (2) and (5) described above, it is possible to realize the reflectance of not less than 70% in the amorphous state and the reflectance of not more than 40% in the crystalline state, and recording can be performed with good sensitivity. From a viewpoint of the recording sensitivity, the thickness of the second protective layer is preferably not less than 5 nm, more preferably not less than 10 nm, and most preferably not less than 20 nm.

Approximately the same results as those described above were obtained when the contensts in the recording layer used in the experiments described above were changed in various ranges. Namely, the content of Ge was changed between 40% and 60%, the content of Te was changed between 45% and 59%, and the sum of contents of Sb and Se was changed between 1% and 20%.

The maximum linear velocity to enable solid phase erasing (erasing without melting process) by one time of laser beam radiation was investigated by changing the sum of contents of Sb and Se in the following range while maintaining constant contents of Ge and Te.

TABLE 4

| Sb + Se total content (atomic %) | Linear velocity (m/s) |
|---|---|
| 0 | 6.0 |
| 1 | 5.0 |
| 5 | 4.5 |
| 10 | 4.0 |
| 20 | 2.8 |

TABLE 4-continued

| Sb + Se total content (atomic %) | Linear velocity (m/s) |
|---|---|
| 25 | 1.4 |
| 30 | 1.2 or less |

Next, the total content of Sb and Se was changed in the following range (Table 5), and the 3T signal and the 11T signal were alternately rewritten 1,000 times at a linear velocity of 1.2 m/s with a recording power of 15 mW and an erasing power of 9 mW to investigate the erasing ratio.

TABLE 5

| Sb + Se total content (atomic %) | Erasing ratio (dB) |
|---|---|
| 0 | 20 |
| 1 | 30 |
| 20 | 30 |
| 25 | 25 |

As for a disk having a total content of Sb and Se of 30 atomic %, melt-erasing (erasing with melting process) had to be performed, and the erasing ratio was decreased by not less than 5 dB at a number of rewriting times of 10. When melt-erasing (erasing with melting process) was performed by increasing the erasing power within the range described above, the erasing ratio was decreased by not less than 5 dB at a number of rewriting times of 10 irrelevant to the total content of Sb and Se.

An effect to increase the number of rewritable times was obtained when at least one interface layer was provided on at least one side in contact with the recording layer between the recording layer and the protective layers, the interface layer comprising, for example, metallic elements having high melting points such as Au, Ti, W, Co, Cr, Mo, Si, and Ge; semiconductor elements; alloy materials thereof; oxides of elements such as Si, Al, Y, and Zr; selenium compounds or sulfides of elements such as Zn and Pb; nitrides of elements such as Si, Al, and Ta; fluorides of elements such as Mg; and carbides of elements such as B and Si. A similar effect was confirmed even when the interface layer was formed in a form of islands.

In the embodiment described above, an intermediate layer was provided in the recording layer so that the recording layer was divided into two layers, the intermediate layer comprising materials similar to those for the interface layer described above. As a result, an effect was obtained in that the cooling time for the recording layer was controlled, and the crystallization process was controlled. Information was recorded on only one layer of the two layers divided by the intermediate layer, or information was recorded on both of the two layers by selecting the magnitude of the recording power. Thus it was possible to allow one recording bit to have a plurality pieces of information.

In the embodiment described above, extremely small acicular magnetic material grains composed of, for example, α-Fe, ferrite, barium ferrite, manganese zinc ferrite, α-FeOOH, α-FeO(OH), α-Fe$_2$O$_3$, γ-Fe$_2$O$_3$, Fe$_3$O$_4$, Co—Ni, Co—Cr, CoO, or Co—Pt were uniformly dispersed or deposited in the recording layer. As a result, crystallization was facilitated by using them as nuclei. Additionally, when recording was performed in an external magnetic field, a crystalline state or an amorphous state each having a structure different from those obtained by recording with no external magnetic field was able be produced.

The recording layer of the recording medium of the present invention can be subjected to overwriting by using a single circular light spot. However, when such a recording layer is subjected to recording after once performing erasing, or when it is subjected to rewriting of record by overwriting, erasing residuals may occur resulting from signals previously written on the same recording track. Such erasing residuals were able to be reduced by aligning levels of reproduced signals from the vicinity of crystalline areas to be a constant level as described above. Additionally, components of the erasing residuals were able to be decreased by determining a difference between signals from a detector arranged for detecting reflected light from one side of the track and a detector arranged on the other opposite side, multiplying the difference by an appropriate multiple to obtain a product, and subtracting the product from a sum of the signals. Only the portion of the recording layer was removed from the recording medium obtained in this embodiment, and the portion was placed under conditions of a temperature of 60° C. and a relative humidity of 95% for 1,000 hours to carry out a test for resistance to oxidation. The portion of the recording layer was scarcely oxidized after 1,000 hours.

Second Embodiment

According to the present invention, an optical recording medium was produced as follows so that the recording medium had a reflectance of not less than 70% when the atomic arrangement of the recording layer was in a stable state, and the recording medium had a reflectance of not more than 40% when the atomic arrangement of the recording layer was in a metastable state. A substrate was provided, comprising a surface of a polycarbonate resin plate having a diameter of 120 mm and a thickness of 1.2 mm on which U-shaped guide grooves having a width of 0.8 μm and a depth of 20 nm were previously formed at a pitch of 1.6 μm. This substrate was placed in a first sputtering chamber in the magnetron sputtering apparatus used in First Embodiment. A metallic layer of Au$_{97}$Co$_3$ having a thickness of 14 nm was formed on the substrate by using an alloy of AuCo as a target, and using argon gas as a sputtering gas. Next, the substrate was transferred to a second sputtering chamber. After that, a first protective layer of (ZnS)$_{80}$(SiO$_2$)$_{20}$ (molar %) having a thickness of 25 nm was formed in argon gas by using a mixture of ZnS and SiO$_2$ as a target. In the same manner, a recording layer of Ge$_{43}$Te$_{41}$Sb$_7$Se$_9$ having a thickness of 20 nm was formed in argon gas in a third sputtering chamber by using a sintered material of GeTeSbSe as a target. Next, a second protective layer of (ZnS)$_{80}$(SiO$_2$)$_{20}$ having a thickness of 30 nm was formed in argon gas in a fourth sputtering chamber by using a mixture of ZnS and SiO$_2$ as a target. Finally, a reflecting layer of Au$_{97}$Co$_3$ having a thickness of 35 nm was formed in argon gas in a fifth sputtering chamber by using an alloy of AuCo as a target. The laminated substrate was withdrawn from the sputtering apparatus, and a protective layer of ultraviolet-curing resin was spin-coated on its uppermost layer.

Figure 3:
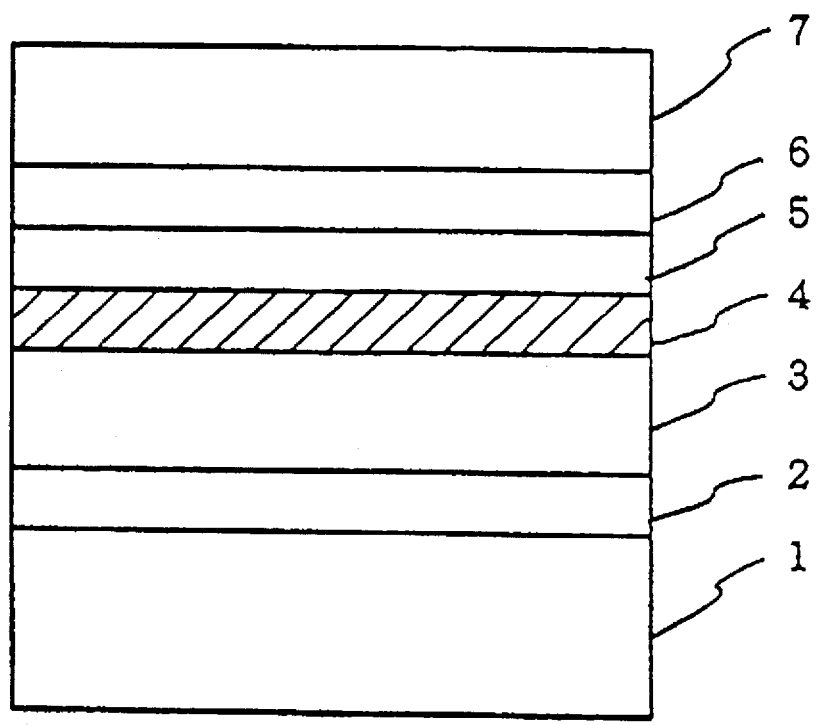
FIG. 3 shows a cross-sectional view illustrating a structure of an optical recording medium obtained in Second Embodiment of the present invention.

The optical recording medium thus obtained had a cross-sectional structure as shown in FIG. 3. The optical recording medium comprised a polycarbonate substrate 1 on which a metallic layer 2 of the Au—Co system, a first protective layer 3 of the ZnS—SiO$_2$ system, a recording layer 4 of the Ge—Te—Sb—Se system, a second protective layer 5 of the ZnS—SiO$_2$ system, a reflecting layer 6 of the Au-Co system, and a protective layer 7 of the ultraviolet-curing resin were successively laminated. The refractive index and the extinction coefficient with respect to a light beam having a wavelength of 780 nm were measured for the materials which constituted each of the layers in accordance with the same technique as that used in First Embodiment. Results similar to those in First Embodiment were obtained.

Automatic focusing and tracking were performed in the same manner as First Embodiment for the disk produced as described above. At this time, specially produced portions with no guide groove had a reflectance of 20%, and portions with the guide groove had a reflectance of 18%.

Next, the recording layer on the recording track was heated by continuously radiating a laser beam of 17 mW while performing tracking. Thus each of the elements was reacted and crystallized to initialize the recording layer. After the initialization, the portions with no guide groove had a reflectance of 72%, and the portions with the guide groove had a reflectance of 70%. At this time, no large physical deformation was observed in the recording layer.

Next, an 11T repeating signal was recorded with a laser power of 34 mW while maintaining the linear velocity of the disk at 1.2 m/s. As a result, recorded portions had an decreased reflectance of 27%. The signal modulation obtained at this time was 61% provided that the signal modulation is defined as a difference in reflectance (difference in signal intensity) between recorded portions and non-recorded portions with respect to a reflectance (signal intensity) of the non-recorded portions. A 3T repeating signal was overwrite-recorded on the track having been once subjected to recording as described above. In this procedure, recording, erasing, and reproduction were performed by using an overwrite waveform as shown in FIG. 2. However, in this embodiment, the recording power was 34 mW which was the same as that used in the initial recording. The erasing power and the reproducing power were 15.5 mW and 1 mW respectively. A signal modulation of 40% was obtained during recording of the 3T signal. At this time, the erasing ratio for the 11T signal was 30 dB.

The disk produced as described above was initialized by using a continuous light beam at 17 mW. After that, a 3T signal was firstly recorded, and then an 11T signal was overwritten. As a result, a similar degree of signal modulation and a similar erasing ratio for the 3T signal were also obtained. Although the overwriting operation was further repeated 1,000 times, subsequent values of them scarcely changed. When the erasing power was increased to 20 mW to perform melt-erasing (erasing with melting process), the erasing ratio was decreased to not more than 25 dB, and the signal modulation of the 11T signal was 50% at the number of overwrite times of 10 or more.

Next, the laser power was modulated between 34 mW and 15.5 mW to record EFM signals on the disk. The disk was installed in a CD-ROM tester provided with an optical head having a wavelength of 780 nm to measure the block error ratio (BLER). At this time, the C1 error ratio was demonstrated as a good value of 0.3%.

The same experiment as that described above was performed except that each of the recording pulses was divided into a plurality of pulses in the same manner as First Embodiment. As a result, it was found that the symmetricalness of recording marks was increased, and the jitter was decreased. Further, this method had an additional effect to decrease the jitter and decrease the C1 error ratio when the number of pulses was decreased by 1 individual, or the laser power from one pulse to the next pulse was lowered to 0 mW or to a power near to that of the reproducing light beam. Moreover, an effect to prevent recrystallization was confirmed when the pulse width of each pulse was changed, and the pulse width was shortened for those pulses which were closer to the leading head pulse. At this time, an additional effect was obtained when the power was increased for those pulses which were closer to the leading head pulse. After performing erasing with a continuous light beam of 17 mW, new information was written by means of direct overwriting. As a result, the jitter was decreased as compared with a case in which the erasing with the continuous light beam was not performed.

Approximately the same results as those described above were obtained when the contensts in the recording layer used in the experiments described above were changed in various ranges. Namely, the content of Ge was changed between 40% and 60%, the content of Te was changed between 45% and 59%, and the sum of contents of Sb and Se was changed between 1% and 20%.

The maximum linear velocity to enable solid phase erasing (erasing without melting process) by one time of laser beam radiation was investigated by changing the sum of contents of Sb and Se in the following range (Table 6) while maintaining constant contents of Ge and Te.

TABLE 6

| Sb + Se total content (atomic %) | Linear velocity (m/s) |
|---|---|
| 0 | 6.0 |
| 1 | 5.0 |
| 5 | 4.5 |
| 10 | 4.0 |
| 20 | 2.8 |
| 25 | 1.4 |
| 30 | 1.2 or less |

Next, the total content of Sb and Se was changed in the following range (Table 7), and the 3T signal and the 11T signal were alternately rewritten 1,000 times at a linear velocity of 1.2 m/s with a recording power of 34 mW and an erasing power of 15.5 mW to investigate the erasing ratio.

TABLE 7

| Sb + Se total content (atomic %) | Erasing ratio (dB) |
|---|---|
| 0 | 20 |
| 1 | 30 |
| 20 | 30 |
| 25 | 25 |

As for a disk having a total content of Sb and Se of 30 atomic %, melting erasing had to be performed, and the erasing ratio was decreased by not less than 5 dB at a number of rewriting times of 10. When melt-erasing (erasing with melting process) was performed by increasing the erasing power within the range described above, the erasing ratio was decreased by not less than 5 dB at a number of rewriting times of 10 irrelevant to the total content of Sb and Se.

An effect to increase the number of rewritable times was obtained in the same manner as First Embodiment when at least one interface layer was provided on at least one side in contact with the recording layer between the recording layer and the protective layers, the interface layer comprising, for example, metallic elements having high melting points such as Au, Ti, W, Co, Cr, Mo, Si, and Ge; semiconductor elements; alloy materials thereof; oxides of elements such as Si, Al, Y, and Zr; selenium compounds or sulfides of elements such as Zn and Pb; nitrides of As for a disk having a total content of Sb and Se of 30 atomic %, melt-erasing (erasing with melting process) had to be performed, and the elements such as Si, Al, and Ta; fluorides of elements such as Mg; and carbides of elements such as B and Si. A similar effect was confirmed even when the interface layer was formed in a form of islands.

In this embodiment, an intermediate layer was provided in the recording layer so that the recording layer was divided into two layers, the intermediate layer comprising materials similar to those for the interface layer described above. As a result, an effect was obtained in that the cooling time for the recording layer was controlled, and the crystallization process was controlled. Information was recorded on only one layer of the two layers divided by the intermediate layer, or information was recorded on both of the two layers by selecting the magnitude of the recording power. Thus it was possible to allow one recording bit to have a plurality pieces of information.

In this embodiment, extremely small acicular magnetic material grains composed of, for example, α-Fe, ferrite, barium ferrite, manganese zinc ferrite, α-FeOOH, α-FeO(OH), α-Fe$_2$O$_3$, γ-Fe$_2$O$_3$, Fe$_3$O$_4$, Co—Ni, Co—Cr, CoO, or Co—Pt were uniformly dispersed or deposited in the recording layer. As a result, crystallization was facilitated by using them as nuclei. Additionally, when recording was performed in an external magnetic field, a crystalline state or an amorphous state each having a structure different from those obtained by recording with no external magnetic field was able be produced.

Also in the optical recording medium of this embodiment, the technique as described in First Embodiment was used to make it possible to decrease components of erasing residuals generated during overwriting by using a single circular light spot.

Only the portion of the recording layer was removed from the recording medium obtained in Second Embodiment, and the portion was placed under conditions of a temperature of 60° C. and a relative humidity of 95% for 1,000 hours to carry out a test for resistance to oxidation. The portion of the recording layer was scarcely oxidized after 1,000 hours.

According to the present invention as described above, we have succeeded in obtaining the optical recording medium capable of being subjected to recording at high sensitivity even at a low laser power, and capable of rewriting over an extremely large number of times. The recording medium of the present invention fulfills the CD standard in relation to the reflectance and the signal modulation. Accordingly, it can be subjected to reproduction by using CD players as well as CD-ROM drives. The phase-change recording medium of the present invention undergoes extremely little deformation of recording marks during recording. Accordingly, it is preferably used for recording and reproduction in accordance with the mark edge system. The phase-change recording medium of the present invention adopts the material of the Ge—Te—Sb—Se system having the specified composition for the recording layer. Accordingly, it is usable for recording at the same linear velocity as the linear velocity for reproduction specified in the CD standard, and it facilitates reading of data by using CD players as well as CD-ROM drives. The optical recording medium of the present invention is also excellent in durability.

The present invention may be practiced or embodied in other various forms without departing from the spirit or essential characteristics thereof. It will be understood that the scope of the present invention is indicated by the appended claims, and all variations and modifications which come within the equivalent range of the claims are embraced in the scope of the present invention.

What is claimed is:

1. An optical recording medium comprising a metallic layer, a first protective layer, a recording layer, a second protective layer, and a reflecting layer on a substrate, said recording medium being subjected to recording through change in atomic arrangement of the recording layer from a stable state to a metastable state, and said recording medium being subjected to initialization and erasing through change from the metastable state to the stable state, wherein:

said recording layer comprises a material containing major components of Ge, Te, Sb, and Se, and said recording layer has an average composition in a direction of thickness which satisfies the following relations as represented by atomic %:

Ge≧40%, and Sb+Se≦25% said recording medium having a reflectance of not more than 40% with respect to a light beam for reproduction when the atomic arrangement of the recording layer is in the stable state, and said recording medium having a reflectance of not less than 70% with respect to the light beam for reproduction when the atomic arrangement of the recording layer is in the metastable state.

2. The optical recording medium according to claim 1, wherein the following relations are satisfied for a refractive index $n_1$ and a thickness $d_1$ of the first protective layer, a refractive index $n_2$ and a thickness $d_2$ of the second protective layer, a refractive index $n_c$ and an extinction coefficient $k_c$ of the recording layer in the stable state, a refractive index $n_a$ and an extinction coefficient $k_a$ of the recording layer in the metastable state, a thickness $d_r$ of the recording layer, and a wavelength λ of the light beam for recording and reproduction:

$k_a < k_c$  (1)

exp $(-4 \pi k_a d_r/\lambda) \geq 0.65$  (2)

exp $(-4 \pi k_c d_r/\lambda) \leq 0.75$  (3)

$N\lambda - \lambda/4 + \Delta 1 \leq 2(n_1 d_1 + n_a d_r + n_2 d_2) \leq N\lambda + \lambda/4 + \Delta 1$ (wherein $N$ is an integer)  (4)

$\lambda/2 + N\lambda - \lambda/4 + \Delta 2 \leq 2n_1 d_1 \leq \lambda/2 + N\lambda + \lambda/4 + \Delta 2$ (wherein $N$ is an integer)  (5)

|Δ1|≦λ/2  (6)

|Δ2|≦λ/2  (7).

3. The optical recording medium according to claim 1, wherein said average composition of the recording layer in the direction of thickness satisfies the following relations as represented by atomic %:

40%≦Ge≦64%

45%≦Te≦59%

1%≦Sb+Se≦20%

Sb<Se.

4. The optical recording medium according to claim 1, wherein said recording layer contains element other than Ge, Te, Sb, and Se in ratio of not more than 10 atomic %.

5. The optical recording medium according to claim 1, wherein said average composition of the recording layer in the direction of thickness satisfies the following relations as represented by atomic %:

40%≦Ge≦55%

35%≦Te≦50%

5%≦Sb+Se≦20%

Sb<Se.

6. The optical recording medium according to claim 1, wherein said average composition of the recording layer in the direction of thickness satisfies the following relations as represented by atomic %:

40%≦Ge≦50%

35%≦Te≦45%

10%≦Sb+Se≦20%

Sb<Se.

7. The optical recording medium according to claim 1, wherein said metallic layer is composed of an AuCo alloy.

8. The optical recording medium according to claim 1, wherein said reflecting layer is composed of an AuCo alloy.

9. The optical recording medium according to claim 1, wherein said optical recording medium is subjected to recording at a linear velocity of not more than 2.8 m/sec during recording.

10. The optical recording medium according to claim 9, wherein said optical recording medium is subjected to recording at a linear velocity of not more than 1.4 m/sec during recording.

11. The optical recording medium according to claim 1, wherein said optical recording medium is subjected to recording and reproduction in accordance with the mark edge recording system.

12. The optical recording medium according to claim 1, wherein said stable state is a crystalline state, and said metastable state is an amorphous state.

13. An optical recording medium comprising a metallic layer, a first protective layer, a recording layer, a second protective layer, and a reflecting layer on a substrate, said recording medium being subjected to recording through change in atomic arrangement of the recording layer from a stable state to a metastable state, and said recording medium being subjected to initialization and erasing through change from the metastable state to the stable state, wherein:

said recording layer comprises a material containing major components of Ge, Te, Sb, and Se, and said recording layer has an average composition in a direction of thickness which satisfies the following relations as represented by atomic %:

Ge≧40%, and Sb+Se≦25% said recording medium having a reflectance of not less than 70% with respect to a light beam for reproduction when the atomic arrangement of the recording layer is in the stable state, and said recording medium having a reflectance of not more than 40% with respect to the light beam for reproduction when the atomic arrangement of the recording layer is in the metastable state.

14. The optical recording medium according to claim 13, wherein the following relations are satisfied for a refractive index $n_1$ and a thickness $d_1$ of the first protective layer, a refractive index $n_2$ and a thickness $d_2$ of the second protective layer, a refractive index $n_c$ and an extinction coefficient $k_c$ of the recording layer in the stable state, a refractive index $n_a$ and an extinction coefficient $k_a$ of the recording layer in the metastable state, a thickness $d_r$ of the recording layer, and a wavelength $\lambda$ of the light beam for recording and reproduction:

$$k_a < k_c \quad (8)$$

$$\exp(-4\pi k_c d_r/\lambda) \geq 0.5 \quad (9)$$

$$\exp(-4\pi k_a d_r/\lambda) \leq 0.5 \quad (10)$$

$$\lambda/2+N\lambda-\lambda/4+\Delta 1 \leq 2(n_1 d_1 + n_a d_r + n_2 d_2) \leq \lambda/2+N\lambda+\lambda/4+\Delta 1 \text{ (wherein } N \text{ is an integer)} \quad (11)$$

$$N\lambda-\lambda/4+\Delta 2 \leq 2n_1 d_1 \leq N\lambda+\lambda/4+\Delta 2 \text{ (wherein } N \text{ is an integer)} \quad (12)$$

$$|\Delta 1| \leq \lambda/2 \quad (13)$$

$$|\Delta 2| \leq \lambda/2 \quad (14).$$

15. The optical recording medium according to claim 13, wherein said average composition of the recording layer in the direction of thickness satisfies the following relations as represented by atomic %:

40%≦Ge≦64%

45%≦Te≦59%

1%≦Sb+Se≦20%

Sb<Se.

16. The optical recording medium according to claim 13, wherein said recording layer contains element other than Ge, Te, Sb, and Se in ratio of not more than 10 atomic %.

17. The optical recording medium according to claim 13, wherein said average composition of the recording layer in the direction of thickness satisfies the following relations as represented by atomic %:

40%≦Ge≦55%

35%≦Te≦50%

5%≦Sb+Se≦20%

Sb<Se.

18. The optical recording medium according to claim 13, wherein said average composition of the recording layer in the direction of thickness satisfies the following relations as represented by atomic %:

40%≦Ge≦50%

35%≦Te≦45%

10%≦Sb+Se≦20%

Sb<Se.

19. The optical recording medium according to claim 13, wherein said metallic layer is composed of an AuCo alloy.

20. The optical recording medium according to claim 13, wherein said reflecting layer is composed of an AuCo alloy.

21. The optical recording medium according to claim 13, wherein said optical recording medium is subjected to recording at a linear velocity of not more than 2.8 m/sec during recording.

22. The optical recording medium according to claim 21, wherein said optical recording medium is subjected to recording at a linear velocity of not more than 1.4 m/sec during recording.

23. The optical recording medium according to claim 13, wherein said optical recording medium is subjected to recording and reproduction in accordance with the mark edge recording system.

24. The optical recording medium according to claim 13, wherein said stable state is a crystalline state, and said metastable state is an amorphous state.

* * * * *